(12) United States Patent
Palto

(10) Patent No.: US 8,416,376 B2
(45) Date of Patent: Apr. 9, 2013

(54) COMPENSATED IN-PLANE SWITCHING MODE LIQUID CRYSTAL DISPLAY

(75) Inventor: Serguei Petrovich Palto, Moscow Region (RU)

(73) Assignee: Crysoptix KK, Tokyo (JP)

( * ) Notice: Subject to any disclaimer, the term of this patent is extended or adjusted under 35 U.S.C. 154(b) by 0 days.

(21) Appl. No.: 12/600,299

(22) PCT Filed: May 19, 2008

(86) PCT No.: PCT/IB2008/051963
§ 371 (c)(1),
(2), (4) Date: Nov. 16, 2009

(87) PCT Pub. No.: WO2008/142635
PCT Pub. Date: Nov. 27, 2008

(65) Prior Publication Data
US 2010/0149471 A1    Jun. 17, 2010

(30) Foreign Application Priority Data
May 18, 2007  (GB) .................................. 0709606.8

(51) Int. Cl.
*G02F 1/1335* (2006.01)
(52) U.S. Cl.
USPC .............................. 349/117; 349/96; 349/119
(58) Field of Classification Search .................. 349/141, 349/96, 117–119
See application file for complete search history.

(56) References Cited

U.S. PATENT DOCUMENTS
2,553,961 A    5/1951 Dreyer

| 7,267,849 B2 * | 9/2007 | Lazarev et al. ................. 428/1.1 |
| 7,619,706 B2 * | 11/2009 | Yano et al. ..................... 349/120 |
| 2005/0104037 A1 * | 5/2005 | Lazarev et al. ............ 252/299.01 |

FOREIGN PATENT DOCUMENTS
WO    2007042788 A    4/2007

OTHER PUBLICATIONS

Anderson et al., "Method and concerns of compensating in-plane switching liquid crystal display," Japan J. Appl. Phys., 39, 2000, pp. 6388-6392.
Palto et al., "Vertically Alligned LCD Designs Optically Compensated by Thin Birefringence Films," IDW'06, 13th IDW, Dec. 6, 2006, pp. 311-314, Japan.
Lazarev et al., "Thin Coatable Birefringent Film," Proc. of SPIE, vol. 6286. Aug. 2006, 8 pages.

(Continued)

*Primary Examiner* — Thoi Duong
(74) *Attorney, Agent, or Firm* — Houst Consulting

(57) ABSTRACT

An in-plane switching type liquid crystal display comprising (a) first and second polarizing plates facing each other and spaced from each other; (b) a liquid crystal cell situated between said first and second polarizing plates; and (c) a compensation structure located between the liquid crystal cell and the first polarizing plate; wherein the director orientation of the liquid crystal layer being controlled by an electric field parallel to the polarizing plates; one said compensation structure is positioned between the liquid crystal cell and the first polarizing plate; the polarizing plates have transmission axes perpendicular to each other, and the compensation structure comprises at least one retardation layer of supramolecules involving at least one polycyclic organic compound with a conjugated π-system and functional groups which are capable of forming non-covalent bonds between said supramolecules.

21 Claims, 8 Drawing Sheets

OTHER PUBLICATIONS

Zhu et al., "28.2: Super Wide View In-Plane Switching LCD With Positive and Negative Uniaxial A-Films Compensation," 2005 SID Int. Symp., Boston, MA, 2005, San Jose, CA: SID, US, vol. XXXVI, May 24, 2005, pp. 1164-1167.

Nakata et al., "P-58: Novel Optical Compensation Films for IPS-LCDs," SID 2006, 2006 SID Int. Symp., SID, LO, vol. XXXVII, May 24, 2005, pp. 420-423.

Itou et al., "A New Transflective IPS-LCD with High Contrast Ratio and Wide Wiewring Angle Performance" IDW'06, 13th IDW, 2006, pp. 635-638.

Geivandov et al., "S1-4: Temperature stable on-glass coatable retarders for in-cell LCD applications," EuroDisplay 2007 Digest, Aug. 17-20, 2007, Moscow, Russia, pp. 26-28.

Palto et al., "Thin Coatable Birefringent Films and Their Application to VA and IPS Mode LCDs", SID 2007 Digest, Long Beach, California, USA, May 20-25, 2007, pp. 1563-1566.

Lydon, "Chromonics," Handbook of Liquid Crystals, Wiley VCH, Weinheim (1998), vol. 2B, p. 981-1007.

* cited by examiner

COMPENSATED IN-PLANE SWITCHING MODE LIQUID CRYSTAL DISPLAY

This invention relates to an in-plane-switching mode liquid crystal display (IPS LCD) device and, more particularly, to the improvement of IPS LCDs aimed at achieving a high contrast ratio and wider viewing angle.

Liquid crystal displays (LCDs) are widely used in watches and clocks, photographic cameras, various instruments, computers, flat TV sets, projection screens, and numerous information devices.

Electro-optical modes employed in LCDs include, in particular, the twisted nematic (TN), super twisted nematic (STN), optically compensated bend (OCB), and electrically controlled birefringence (ECB) modes with their various modifications, as well as some others. All these modes use an electric field, which is substantially perpendicular to the substrate and, hence, to the liquid crystal (LC) layer. Besides these modes, there are some electro-optical modes employing an electric field substantially parallel to the substrate and, hence, to the liquid crystal layer. An example is offered by the in-plane switching (IPS) mode. This electro-optical mode is especially frequently used in LCDs for modern desktop monitors and is envisaged for use in future displays for multimedia applications.

The viewing angle of IPS mode LCDs is reasonably good, however, at certain oblique viewing angles, the image quality can deteriorate. This drawback is largely caused by both LC layer and the fundamental limitations of the polarizer sheets (see, e.g., J E Anderson and P J Bos, Jpn. J. Appl. Phys., 39 (2000) 6388 or Yukito Saitoh et al, Jpn. J. Appl. Phys. 37 (1998) 4822-4828).

Methods for compensating the IPS mode have also been disclosed in prior art. For example, an IPS display that comprises a first optically uniaxial positive compensation layer with an optical axis perpendicular to the plane of the layer (positive C-plate) and optionally a second optically uniaxial positive compensation layer with the optical axis parallel to the plane of the layer (positive A-plate). Another example is an IPS LCD comprising an optically uniaxial negative compensation layer with the optical axis parallel to the plane of the layer (negative A-plate), which is formed by a discotic LC film.

However, the compensation sheets proposed in prior art to compensate IPS LCDs are either difficult to manufacture on a large scale, like, for example, the homeotropically aligned discotic film, or tend to suffer from some durability problems, and are particularly difficult to manufacture for large area displays, like, for example, the stretched polymeric films which are usually employed as positive A- and C-plates. In addition, the manufacturing costs of an IPS compensator are often relatively expensive because, for example, the A-plate should preferably be arranged so that its slow axis would be perpendicular to the stretch direction of the polarizer.

Another important factor that should be taken into consideration in particular, when compensating a Normally Black (NB) IPS mode LCD that is not transmitting until the electric field is applied is the birefringent film substrate that is attached to the polarizer. Usually, this is a plastic film of a slightly birefringent material such as, for example, triacetylcellulose (TAC). In the case of NB IPS displays, these films often deteriorate the viewing angle of the display and introduce additional features, which have to be compensated. (J E Anderson and P J Bos, Jpn. J. Appl. Phys., 39 (2000) 6388).

Some new types of materials for manufacturing optical anisotropic films are known in the prior art. For example, organic dichroic dyes represent the new class of materials currently gaining prominence in the manufacture of optically anisotropic films with desirable optical characteristics. Films based on these materials are formed by applying an aqueous liquid crystal solution of supramolecules composed of dye molecules onto a substrate surface, followed the evaporation of water. The resulting films are imparted anisotropic properties either by preliminary mechanical ordering of the underlying substrate surface as described in U.S. Pat. No. 2,553,961 or by applying an external mechanical, electromagnetic, or other orienting action to the coating on a liquid crystal substrate material.

Similar films are formed from lyotropic liquid crystals (LLCs) based on supramolecules. Substantial ordering of dye molecules in columns makes possible the use of these mesophases for creating oriented, strongly dichroic films. Dye molecules that form supramolecular liquid crystal mesophases possess special properties. They contain hydrophilic functional groups located at the periphery of the molecule, which determine the solubility of the dye in water. Organic dye mesophases are characterized by specific structures, phase diagrams, optical properties, and solubility as described in greater detail in J. Lydon, Chromonics, in Handbook of Liquid Crystals, (Wiley VCH: Weinheim, 1998), Vol. 2B, pp. 981-1007.

Anisotropic films characterized by high optical anisotropy can be formed from LLC systems based on dichroic dyes. Such films exhibit both the properties of E-type polarizers, which are due to light absorption by supramolecular complexes, and the properties of retarders. Retarders are films possessing phase-retarding properties in the spectral regions where the optical absorption is absent. The phase-retarding properties of the anisotropic films are determined by their double refraction (birefringent) properties, whereby the refractive indices are different in the direction of LLC solution application and in the perpendicular direction.

Extensive investigations aimed at developing new methods and creating new dye-based films through modification of the deposition conditions are currently underway. Of special interest is the search for new compositions of lyotropic liquid crystals. New LLC compositions can be obtained by introducing modifiers, stabilizers, surfactants, and other additives into the known dyes, so as to improve the film characteristics.

The present invention provides a compensated IPS mode LCD with improved optical performance, in particular, higher contrast at a wide viewing angle, reduced color shift, facilitated manufacture, and economic fabrication even on a large scale. The design of an IPS LCD, which comprises a compensation structure including at least one retardation layer of supramolecules, which involve at least one polycyclic organic compound with a conjugated π-system and functional groups, makes possible a significant improvement in color rendering properties and contrast ratios of liquid crystal displays over a wide range of viewing angles.

In a first aspect, the present invention provides an in-plane switching type liquid crystal display comprising (a) first and second polarizing plates facing each other and spaced from each other; (b) a liquid crystal cell situated between said first and second polarizing plates; and (c) at least one compensation structure located between the liquid crystal cell and the polarizing plate; wherein the director orientation of the liquid crystal layer of said cell being controlled by an electric field parallel to the polarizing plates; wherein one compensation structure is located between the liquid crystal cell and the first polarizing plate; and wherein the polarizing plates have transmission axes perpendicular to each other, and the compensation structure comprises at least one retardation layer of supramolecules involving at least one polycyclic organic compound with a conjugated π-system and functional groups which are capable of forming non-covalent bonds between said supramolecules.

The general description of the present invention having been made, a further understanding can be obtained by reference to the specific preferred embodiments, which are given herein only for the purpose of illustration and are not intended to limit the scope of the appended claims.

In one embodiment of the liquid crystal display, the organic compound has a general structural formula (I)

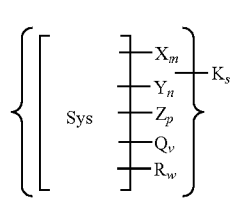

where Sys is at least partially conjugated substantially planar heterocyclic or cyclic molecular system, X is a carboxylic group —COON, m is 0, 1, 2, 3 or 4; Y is a sulfonic group —$SO_3H$, n is 0, 1, 2, 3 or 4; Z is an amide of a carboxylic acid group, p is 0, 1, 2, 3 or 4; Q is an amide of a sulfonic acid group, v is 0, 1, 2, 3 or 4; K is a counterion; s is the number of counterions providing neutral state of the molecule; R is a substituent selected from the list comprising $CH_3$, $C_2H_5$, $NO_2$, Cl, Br, F, $CF_3$, CN, OH, $OCH_3$, $OC_2H_5$, $OCOCH_3$, OCN, SCN, $NH_2$, and $NHCOCH_3$, and w is 0, 1, 2, 3 or 4. The supramolecules have rod-like or planar shapes.

Preferably, K is selected from the list comprising the following ions: $H^+$, $NH_4^+$, $Na^+$, $K^+$, $Li^+$, $Ba^{++}$, $Ca^{++}$, $Mg^{++}$, $Sr^{++}$, $Cs^+$, $Pb^{++}$, and $Zn^{++}$. The polyvalent counterions (cations) may be used for stabilization of the organic compounds and provide their insolubility.

In one embodiment of the liquid crystal display, the molecular system Sys is substantially transparent in the visible spectral range. In the present invention it is supposed that the visible range has a lower boundary that is approximately equal to 400 nm, and an upper boundary that is approximately equal to 700 nm. In another embodiment of the liquid crystal display, the molecular system Sys has the general structural formulas corresponding to structures II-XLVIII given in Table A:

TABLE A

Examples of at least partially conjugated substantially planar polycyclic molecular systems (Sys) which are substantially transparent in the visible spectral range

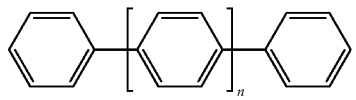

(II)

where n is the number in the range from 1 to 8

Oligophenyls

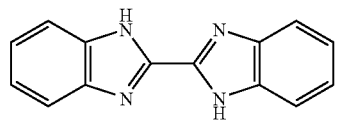

(III)

1H,1'H-2,2'-bibenzimidazole

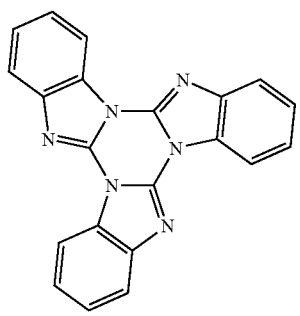

(IV)

bisbenzimidazo[1',2':3,4;1'',2'':5,6][1,3,5]triazino[1,2-a]benzimidazole

TABLE A-continued
Examples of at least partially conjugated substantially planar polycyclic molecular systems (Sys) which are substantially transparent in the visible spectral range
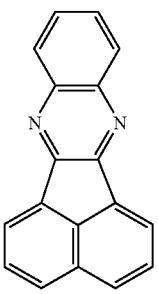
acenaphtho[1,2-b]quinoxaline
(V)
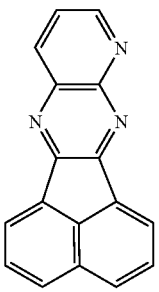
acenaphtho[1,2-b]pyrido[2,3-e]pyrazine
(VI)
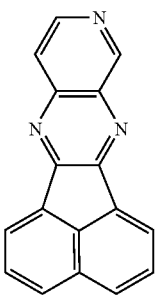
acenaphtho[1,2-b]pyrido[3,4-e]pyrazine
(VII)
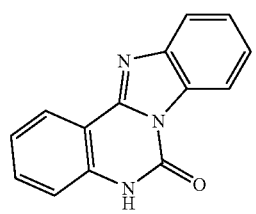
benzimidazo[1,2-c]quinazolin-6(5H)-one
(VIII)

TABLE A-continued

Examples of at least partially conjugated substantially planar polycyclic molecular systems (Sys) which are substantially transparent in the visible spectral range

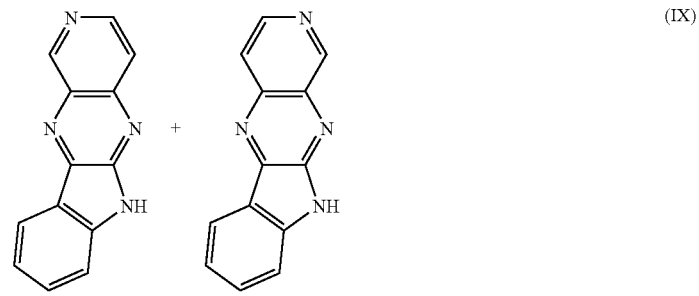

6H-pyrido[3',4':5,6]pyrazino[2,3-b]indole & 10H-pyrido[4',3':5,6]pyrazino[2,3-b]indole (IX)

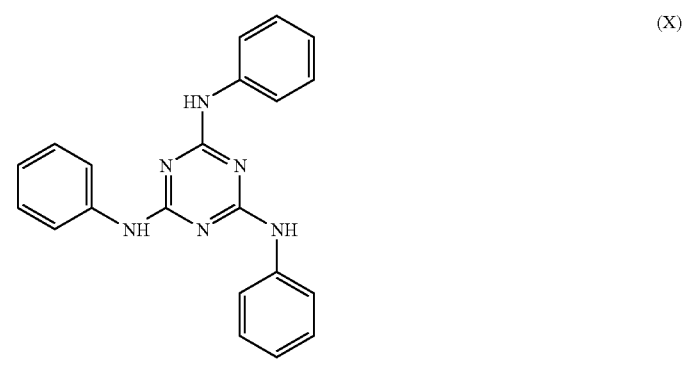

N,N',N''-triphenyl-1,3,5-triazine-2,4,6-triamine (X)

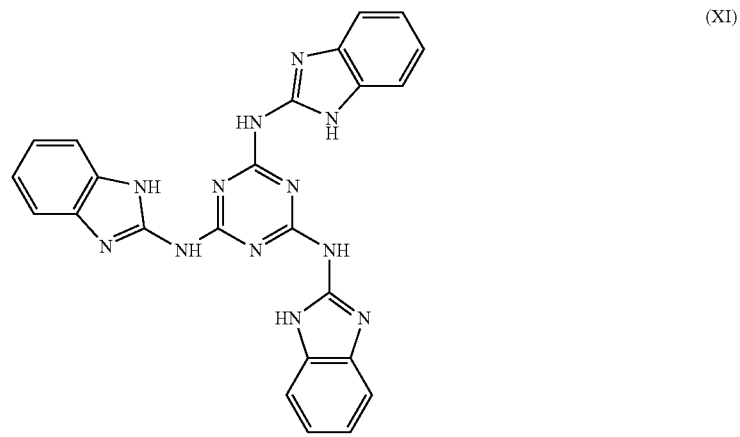

N,N',N''-tris(1H-benzimidazol-2-yl)-1,3,5-triazine-2,4,6-triamine (XI)

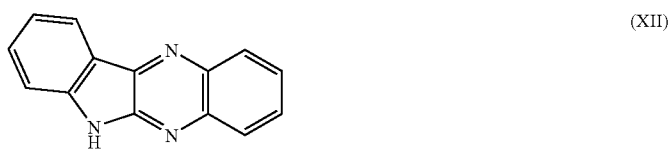

6H-indolo[2,3-b]quinoxaline (XII)

TABLE A-continued

Examples of at least partially conjugated substantially planar polycyclic molecular systems (Sys) which are substantially transparent in the visible spectral range

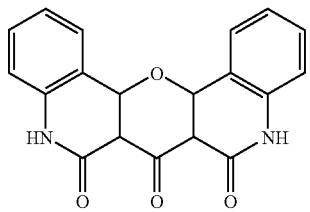

3,4,6,7-Dibenzo-4a,5a,9a,10a-tetrahydro-1H-pyrido[3',4':5,6]pyrano[3,2-c]pyridine-1,9,10(2H,8H)-trione (XIII)

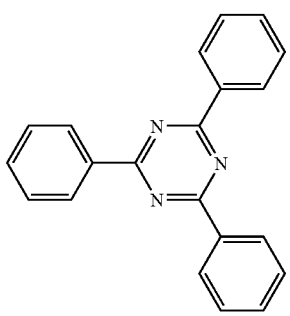

2,4,6-triphenyl-1,3,5-triazine (XIV)

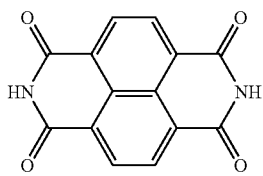

benzo[lmn]-3,8-phenanthroline-1,3,6,8(2H,7H)-tetrone (XV)

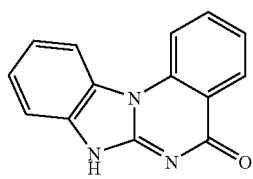

benzimidazo[1,2-a]quinazolin-5(7H)-one (XVI)

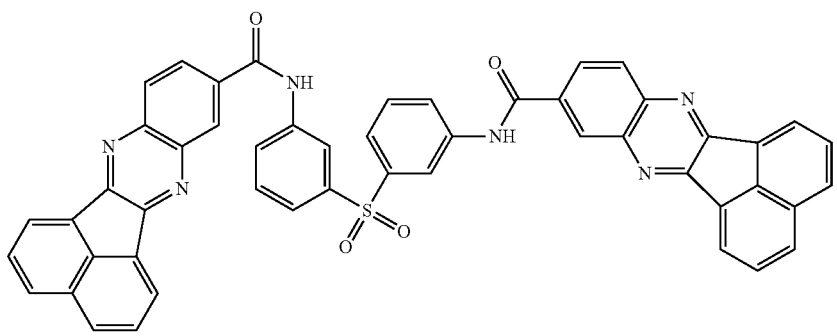

N,N'-[sulfonylbis(3,1-phenylene)]bisacenaphtho[1,2-b]quinoxaline-9-carboxamide (XVII)

TABLE A-continued

Examples of at least partially conjugated substantially planar polycyclic molecular systems (Sys) which are substantially transparent in the visible spectral range

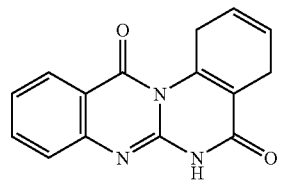

4H-quinazolino[3,2-a]quinazoline-5,12(1H,6H)-dione (XVIII)

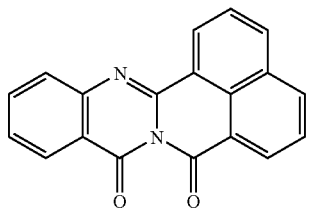

7H,9H-benzo[4,5]isoquino[1,2-b]quinazoline-7,9-dione (XIX)

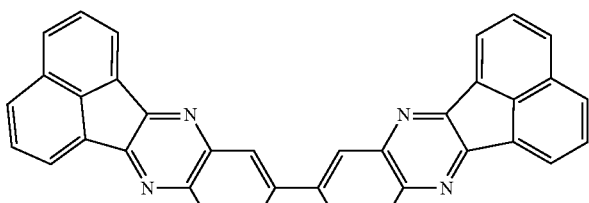

9,9'-biacenaphtho[1,2-b]quinoxaline (XX)

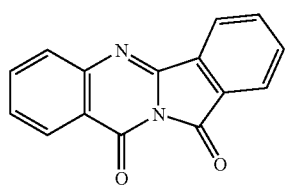

isoindolo[1,2-b]quinazoline-10,12-dione (XXI)

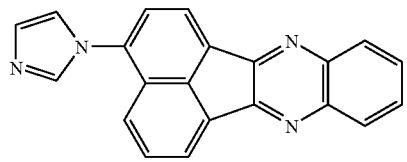

3-(1H-imidazol-1-yl)acenaphtho[1,2-b]quinoxaline (XXII)

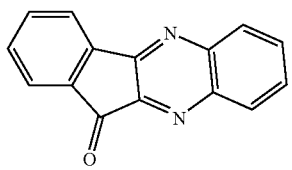

11H-indeno[1,2-b]quinoxalin-11-one (XXIII)

TABLE A-continued

Examples of at least partially conjugated substantially planar polycyclic molecular systems (Sys) which are substantially transparent in the visible spectral range

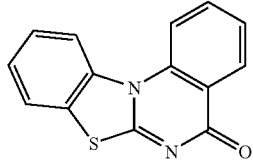

5H-[1,3]benzothiazolo[3,2-a]quinazolin-5-one (XXIV)

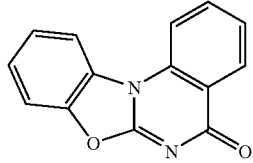

5H-[1,3]benzoxazolo[3,2-a]quinazolin-5-one (XXV)

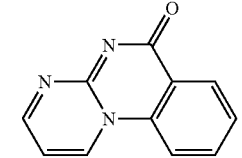

6H-pyrimido[1,2-a]quinazolin-6-one (XXVI)

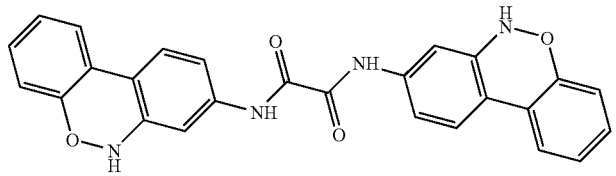

N,N'-di-6H-dibenzo[c,e][1,2]oxazin-8-ylethanediamide (XXVII)

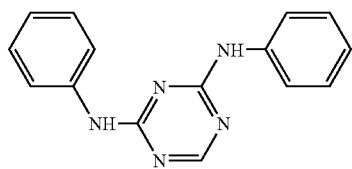

N,N'-diphenyl-1,3,5-triazine-2,4-diamine (XXVIII)

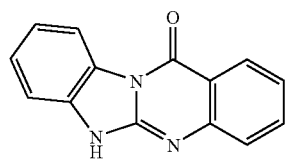

benzimidazo[2,1-b]quinazolin-12(6H)-one (XXIX)

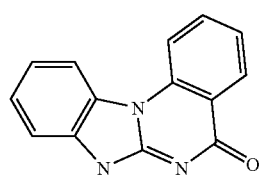

benzimidazo[1,2-a]quinazolin-5(7H)-one (XXX)

TABLE A-continued

Examples of at least partially conjugated substantially planar polycyclic molecular systems (Sys) which are substantially transparent in the visible spectral range

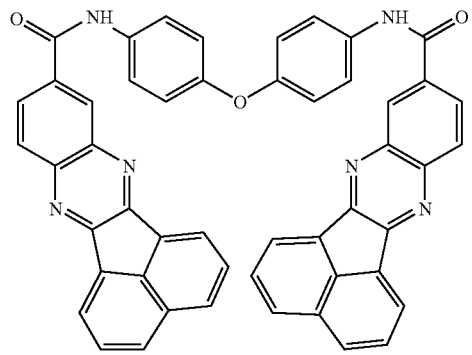

N,N'-[oxybis(4,1-phenylene)]bisacenaphtho[1,2-b]quinoxaline-9-carboxamide (XXXI)

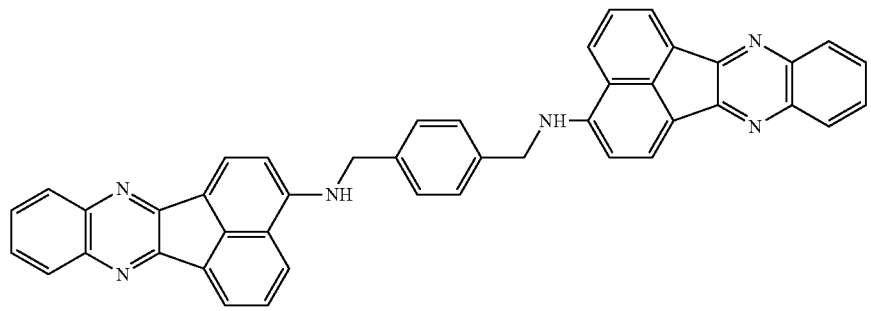

N,N'-[1,4-phenylenedi(methylene)]bisacenaphtho[1,2-b]quinoxalin-3-amine (XXXII)

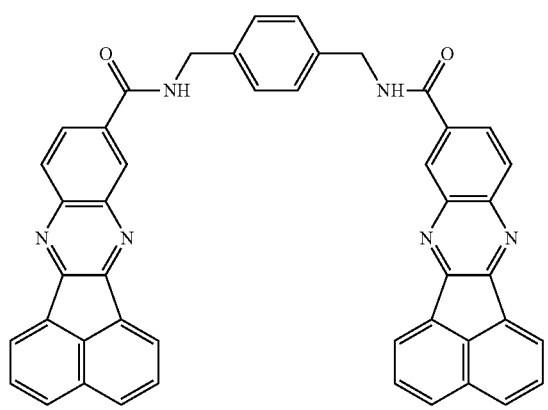

N,N'-[1,4-phenylenedi(methylene)]bisacenaphtho[1,2-b]quinoxaline-9-carboxamide (XXXIII)

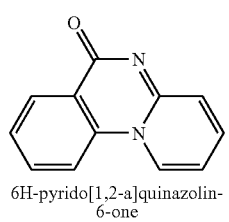 [SMILES: O=c1nc2ccccn2c2ccccc12]

6H-pyrido[1,2-a]quinazolin-6-one (XXXIV)

TABLE A-continued

Examples of at least partially conjugated substantially planar polycyclic molecular systems (Sys) which are substantially transparent in the visible spectral range

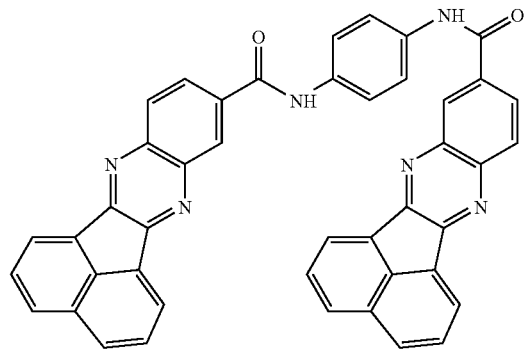

N,N'-1,4-phenylenebisacenaphtho[1,2-b]quinoxaline-9-carboxamide (XXXV)

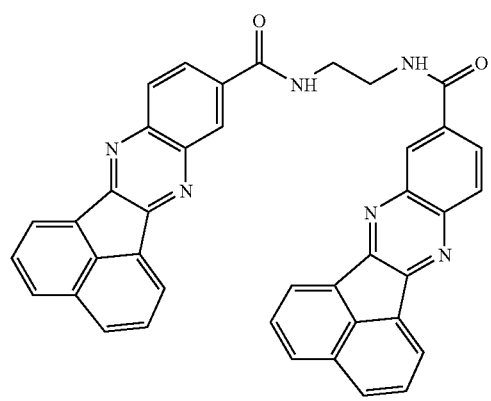

N,N'-ethane-1,2-diylbisacenaphtho[1,2-b]quinoxaline-9-carboxamide (XXXVI)

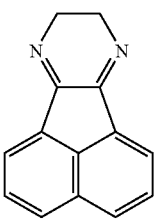

8,9-dihydroacenaphtho[1,2-b]pyrazine (XXXVII)

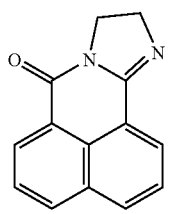

9,10-dihydro-7H-benzo[de]imidazo[2,1-a]isoquinolin-7-one (XXXVIII)

TABLE A-continued

Examples of at least partially conjugated substantially planar polycyclic molecular systems (Sys) which are substantially transparent in the visible spectral range

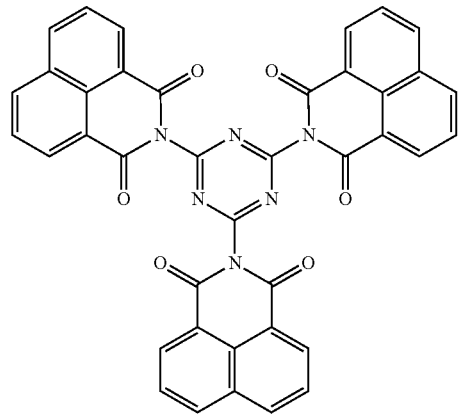

2,2',2''-(1,3,5-triazine-2,4,6-triyl)tris(1H-benzo[de]isoquinoline-1,3(2H)-dione)

(XXXIX)

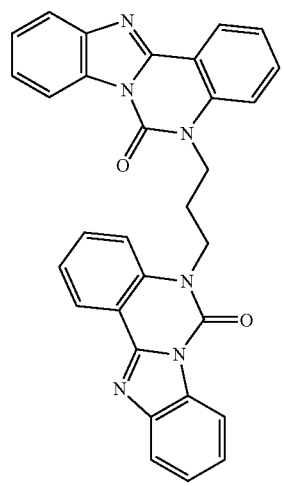

5,5'-propane-1,3-diylbisbenzimidazo[1,2-c]quinazolin-6(5H)-one (XL)

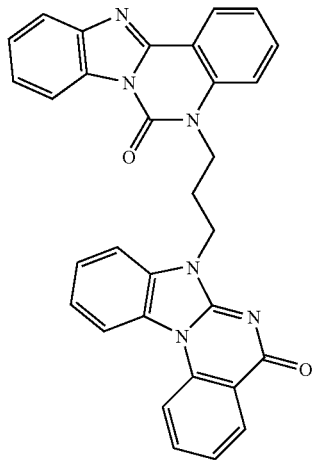

5-[3-(5-oxobenzimidazo[1,2-a]quinazolin-7(5H)-yl)propyl]benzimidazo[1,2-c]quinazolin-6(5H)-one (XLI)

TABLE A-continued
Examples of at least partially conjugated substantially planar polycyclic molecular systems (Sys) which are substantially transparent in the visible spectral range
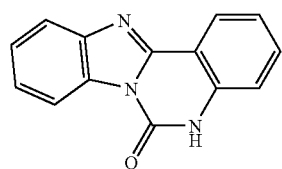
benzimidazo[1,2-c]quinazolin-6(5H)-one
(XLII)
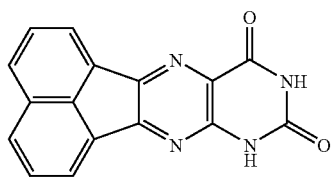
acenaphtho[1,2-g]pteridine-9,11(8H,10H)-dione
(XLIII)
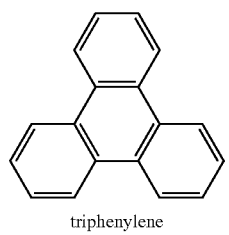 [SMILES: c1ccc2c(c1)c1ccccc1c1ccccc21]
triphenylene
(XLIV)
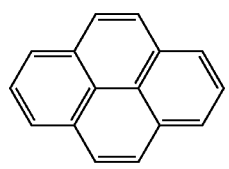
pyrene
(XLV)
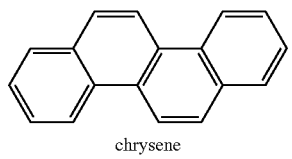 [SMILES: c1ccc2c(c1)ccc1c3ccccc3ccc21]
chrysene
(XLVI)
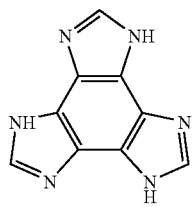
Tris(imidazole)
(XLVII)

TABLE A-continued

Examples of at least partially conjugated substantially planar polycyclic molecular systems (Sys) which are substantially transparent in the visible spectral range

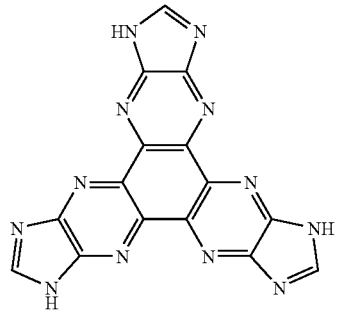

(XLVIII)

6,11-dihydro-1H-imidazo[4,5-b]bisimidazo[4',5':5,6]pyrazino[2,3-f:2',3'-h]quinoxaline In one preferred embodiment of the disclosed liquid crystal display, the organic compound is an oligophenyl derivative. Examples of the oligophenyl derivative having general structural formulas corresponding to structures 1-7 are given in Table 1.

TABLE 1

Examples of the oligophenyl derivatives

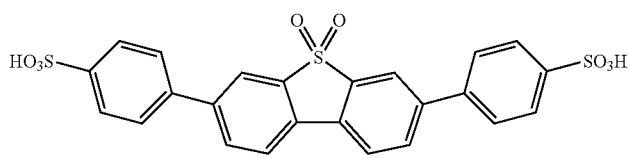

(1)

4,4'-(5,5-dioxidodibenzo[b,d]thiene-3,7-diyl)dibenzenesulfonic acid

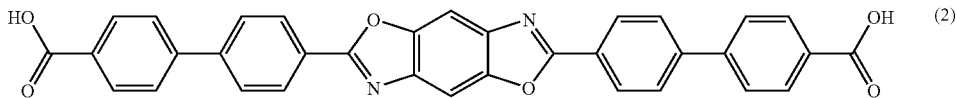

(2)

4,4''-[1,3]oxazolo[5,4-f][1,3]benzoxazole-2,6-diyldibiphenylsulfonic acid

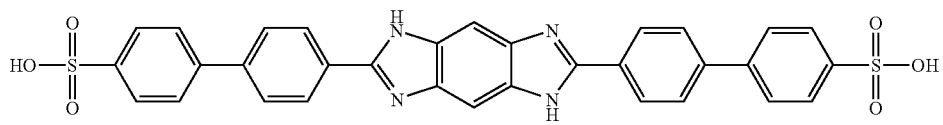

(3)

4,4''-(1,5-dihydroimidazo[4,5-f]benzimidazole-2,6-diyl)dibiphenylsulfonic acid

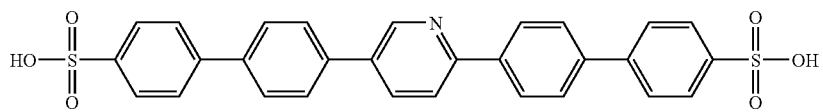

(4)

4',4''-pyridine-2,5-diyldibiphenyl-4-sulfonic acid

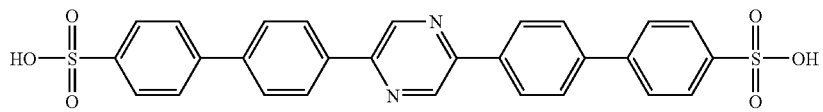

(5)

4',4''-pyrazine-2,5-diyldibiphenyl-4-sulfonic acid

TABLE 1-continued

Examples of the oligophenyl derivatives (6) 4',4''-pyrimidine-2,5-diyldibiphenyl-4-carboxylic acid (7) 4',4''-(1,3,4-oxadiazole-2,5-diyl)dibiphenyl-4-sulfonic acid In another preferred embodiment of the disclosed liquid crystal display, the organic compound is a bibenzimidazole derivative. Examples of the bibenzimidazole derivative having general structural formulas corresponding to structures 8-9 are given in Table 2.

TABLE 2

Examples of the bibenzimidazole derivatives (8)

(9)

In still another preferred embodiment of the disclosed liquid crystal display, the organic compound is a "triazine" derivative. Examples of the "triazine" derivatives having general structural formulas corresponding to structures 10-12 are given in Table 3.

TABLE 3

Examples of the "triazine" derivatives (10)

TABLE 3-continued

Examples of the "triazine" derivatives (11)

$R = CH_3, C_2H_5, C_3H_7, C_4H_9$ (12)

In one preferred embodiment of the disclosed liquid crystal display, the organic compound is an acenaphthoquinoxaline derivative. Examples of acenaphthoquinoxaline sulfonamide derivatives containing at least one carboxylic group (wherein m is equal to 1, 2, 3 or 4) and having general structural formulas corresponding to structures 13-19 which are given in Table 4.

TABLE 4

Examples of acenaphthoquinoxaline sulfonamide derivatives containing carboxylic groups

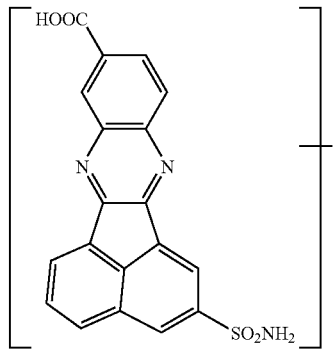
(13)

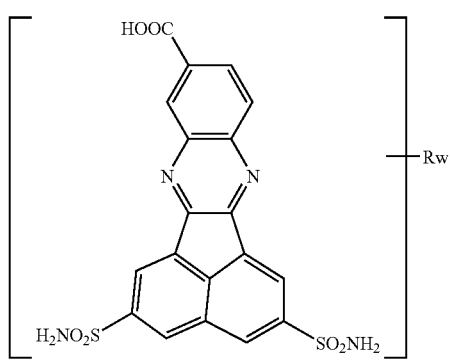
(14)

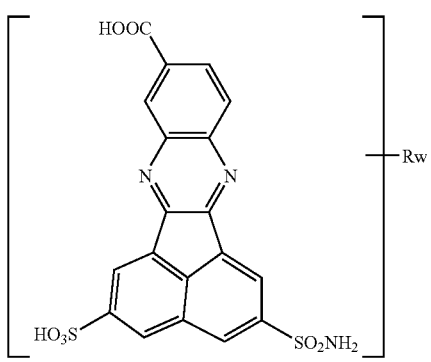
(15)

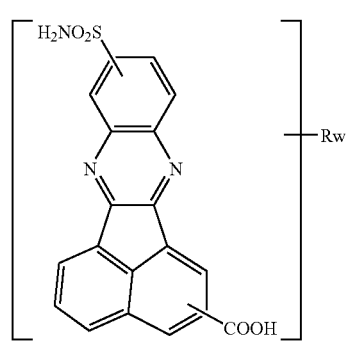
(16)

TABLE 4-continued

Examples of acenaphthoquinoxaline sulfonamide derivatives containing carboxylic groups

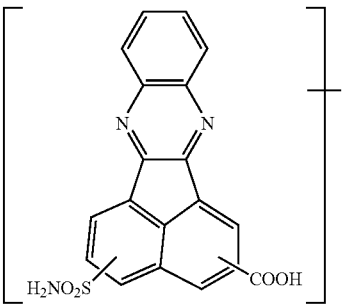
(17)

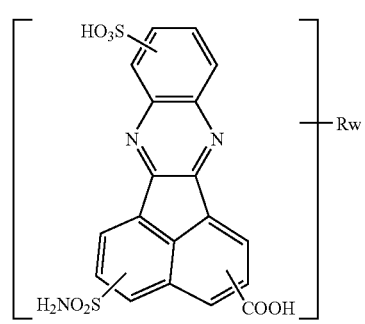
(18)

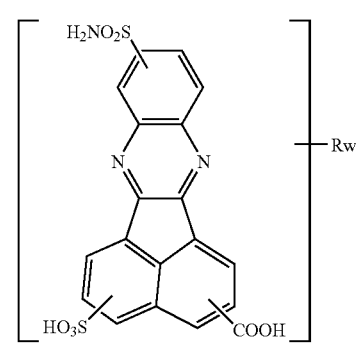
(19)

In another embodiment of the disclosed liquid crystal display the organic compound comprises at least one sulfonic group, wherein n is equal to 1, 2, 3 or 4. Examples of the acenaphthoquinoxaline sulfonamide derivative containing at least one sulfonic group and having general structural formulas corresponding to structures 20-31 are given in Table 5.

TABLE 5

Examples of acenaphthoquinoxaline sulfonamide derivatives containing sulfonic groups

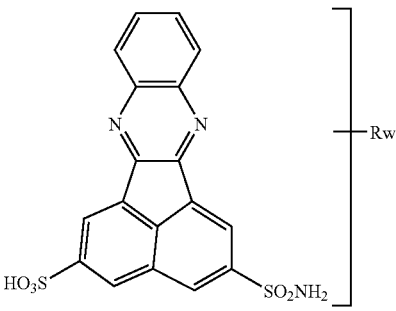
(20)

TABLE 5-continued
Examples of acenaphthoquinoxaline sulfonamide derivatives containing sulfonic groups
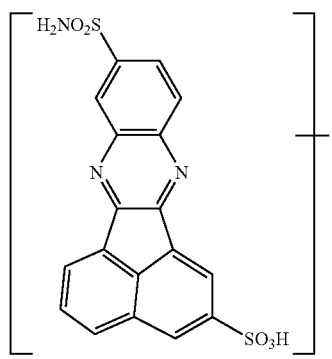
(21)
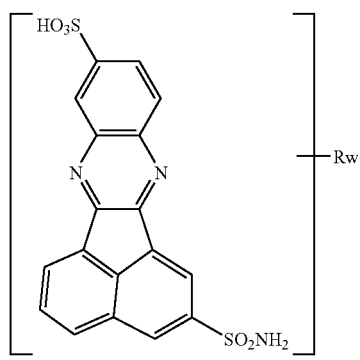
(22)
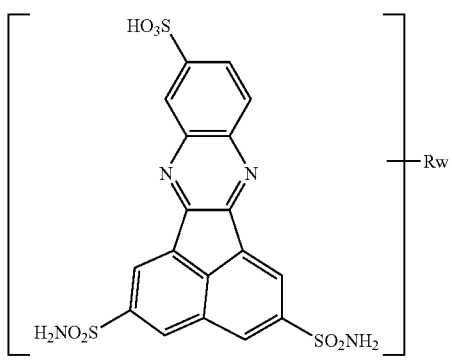
(23)
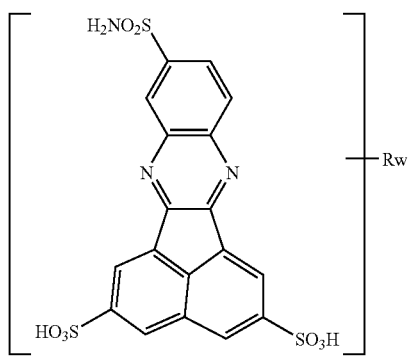
(24)
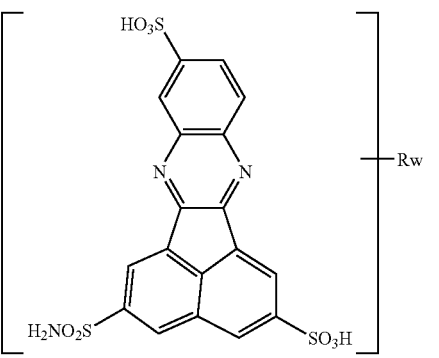
(25)
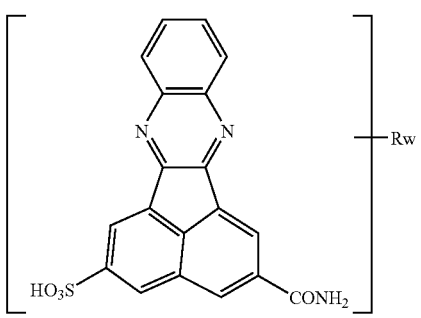
(26)
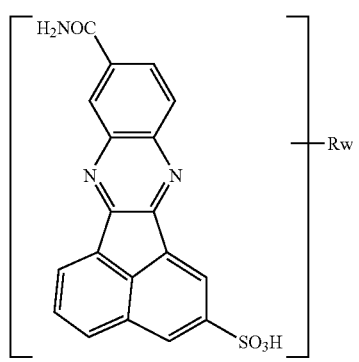
(27)
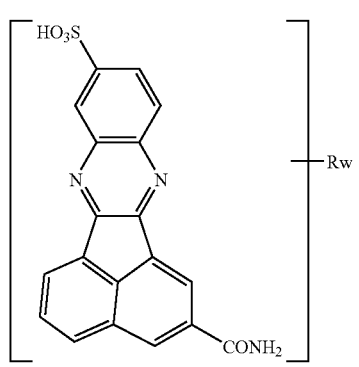
(28)

TABLE 5-continued

Examples of acenaphthoquinoxaline sulfonamide derivatives containing sulfonic groups (29), (30), (31)

TABLE 6

Examples of 6,7-dihydrobenzimidazo[1,2-c]quinazolin-6-one derivatives containing carboxylic groups (32), (33), (34), (35), (36), (37)

In another preferred embodiment of the liquid crystal display, the organic compound is a 6,7-dihydrobenzimidazo[1,2-c]quinazolin-6-one derivative having at least one carboxylic group or at least one acid amide group as the functional group.

In one preferred embodiment of the liquid crystal display, the 6,7-dihydrobenzimidazo[1,2-c]quinazolin-6-one derivative has at least one carboxyamide group ($CONH_2$) as the acid amide group. In another preferred embodiment of the disclosed liquid crystal display, the 6,7-dihydrobenzimidazo[1,2-c]quinazolin-6-one derivative has at least one sulfonamide group ($SO_2NH_2$) as the acid amide group. Examples of 6,7-dihydrobenzimidazo[1,2-c]quinazolin-6-one derivatives comprising at least one carboxylic group —COON, wherein m is 1, 2 or 3 and said derivative has general structural formula from the group comprising structures 32 to 44, are given in Table 6.

TABLE 6-continued

Examples of 6,7-dihydrobenzimidazo[1,2-c]quinazolin-6-one derivatives containing carboxylic groups

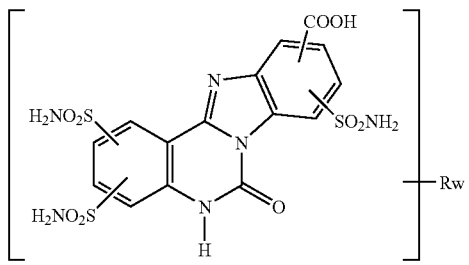
(38)

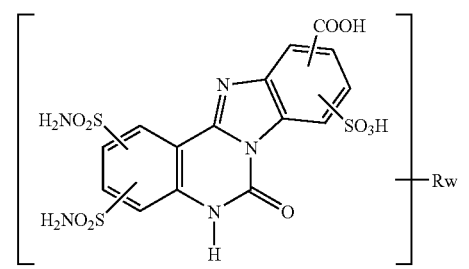
(39)

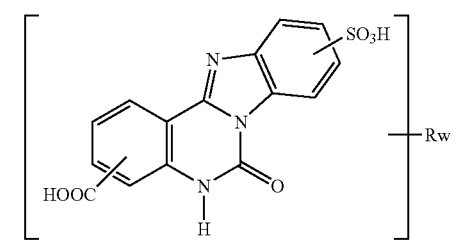
(40)

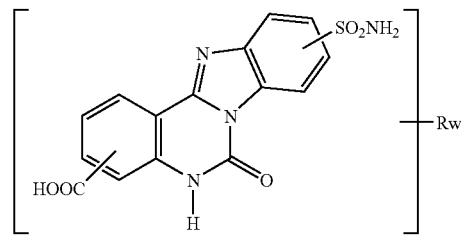
(41)

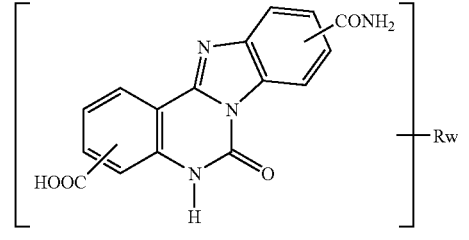
(42)

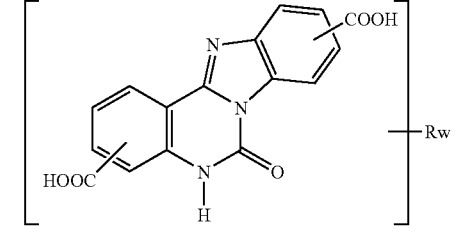
(43)

TABLE 6-continued

Examples of 6,7-dihydrobenzimidazo[1,2-c]quinazolin-6-one derivatives containing carboxylic groups

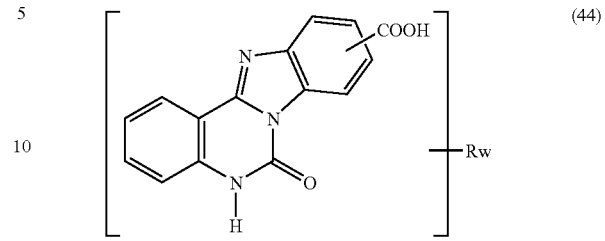
(44)

In another preferred embodiment of the liquid crystal display, the 6,7-dihydrobenzimidazo[1,2-c]quinazolin-6-one derivative comprises at least one sulfonic group —SO$_3$H. Examples of the 6,7-dihydrobenzimidazo[1,2-c]quinazolin-6-one derivatives comprising sulfonic groups —SO$_3$H, wherein n is 1, 2 or 3 and said derivative has the general structural formula from the list comprising structures 45 to 53, are given in Table 7.

TABLE 7

Example of 6,7-dihydrobenzimidazo[1,2-c]quinazolin-6-one derivatives containing sulfonic groups

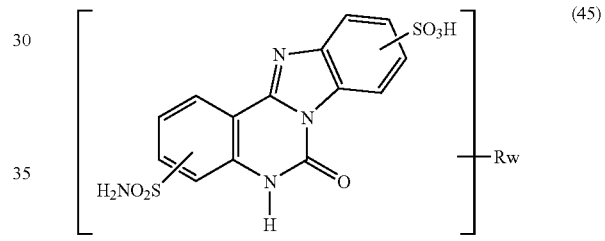
(45)

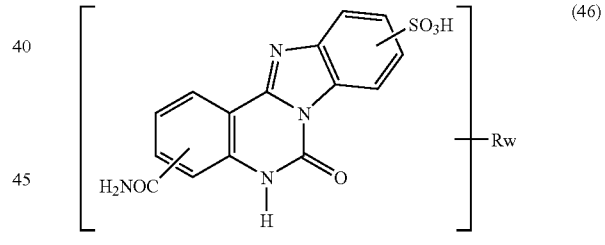
(46)

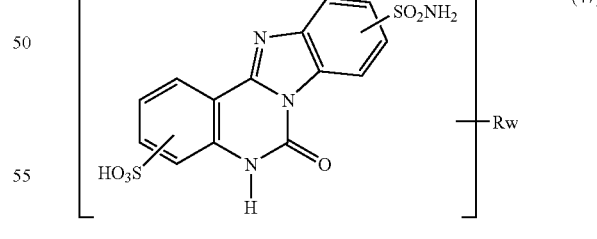
(47)

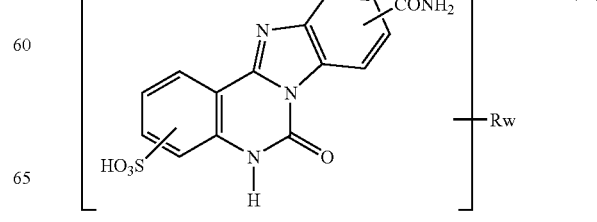
(48)

TABLE 7-continued

Example of 6,7-dihydrobenzimidazo[1,2-c]quinazolin-6-one derivatives containing sulfonic groups

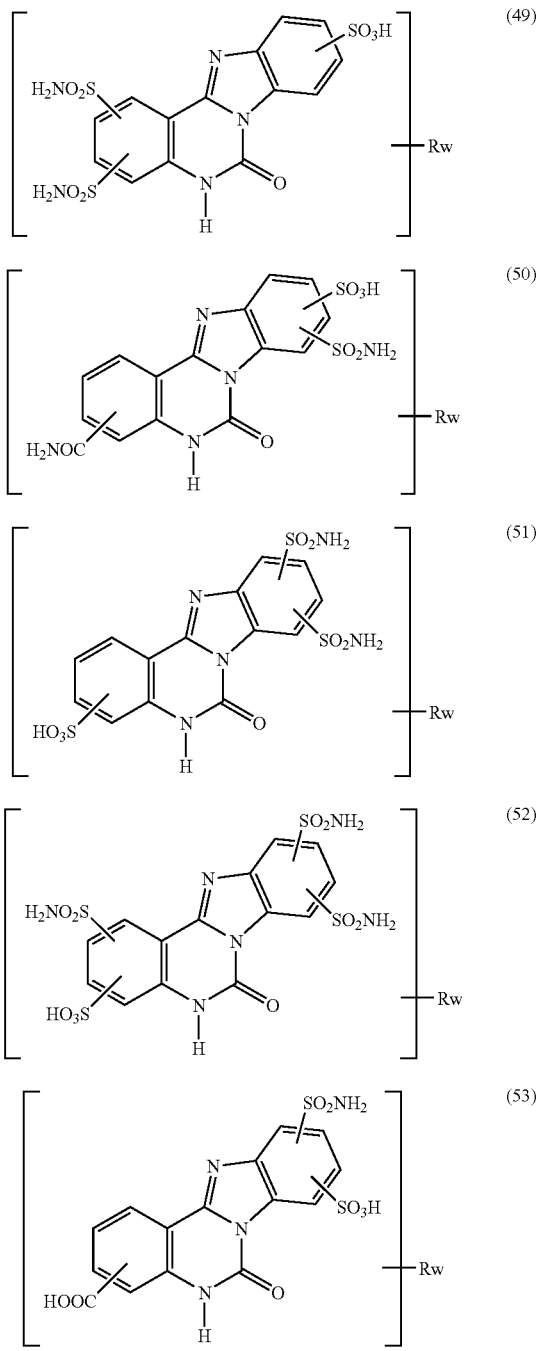

The supramolecule is an association of at least partially planar, more preferably substantially planar, π-conjugated molecules in a stack. The number of molecules in association is preferably defined by conditions of formation such as temperature, pressure, additives and so forth, and not precisely and definitively by the molecules' structure or the composition of functional groups.

In a preferred embodiment of the present invention, the supramolecules comprise at least one polycyclic organic compound with a conjugated π-system and functional groups which are capable of forming non-covalent bonds between said supramolecules. Functional groups of one molecule are preferably designed in such a way that they may interact with each other with formation of inter-stack non-covalent bonding, forming a fully saturated three dimensional network of non-covalent bonds. The retardation layers can be transparent for electromagnetic radiation only in a part of the visible wavelength range, rather than in the entire range, and this part of said wavelength band will be called a subrange. This subrange can be determined experimentally for each polycyclic organic compound with a conjugated π-system and functional groups.

In still another preferred embodiment of the present invention, the molecules of at least one organic compound comprise heterocycles. In yet another preferred embodiment of the present invention, at least one of said retardation layers is insoluble in water.

In one embodiment of the present invention, the compensating structure comprises at least two said retardation layers, of which at least one said retardation layer comprises an uniaxial retardation layer of the negative A-plate type, the fast axis of which is substantially parallel to the absorption axis of the first polarizing plate, and at least one said retardation layer is uniaxial retardation layer of the negative C-plate type.

In still another embodiment of the liquid crystal display, said retardation layer comprises an uniaxial retardation layer of the negative A-plate type, the fast axis of which is substantially parallel to the absorption axis of the first polarizing plate, and the compensation structure further comprises a layer of triacetyl cellulose (TAC).

In another embodiment of the present invention, said compensation structure comprises at least two said retardation layers, of which at least one said retardation layer comprises a biaxial retardation layer of the negative AB-plate type and at least one said retardation layer comprises an uniaxial retardation layer of the negative C-plate type. In still another embodiment of the present invention, each of the first and second polarizing plates further comprises at least one layer of triacetyl cellulose (TAC).

In yet another embodiment of the liquid crystal display, said retardation layer comprises a biaxial retardation layer of the negative AB-plate type, and the compensation structure further comprises a layer of triacetyl cellulose (TAC). In still another embodiment of the present invention, each of the first and second polarizing plates further comprises at least one layer of triacetyl cellulose (TAC).

In another embodiment of the present invention, the liquid crystal display comprises two compensation structures, of which one said compensation structure is positioned between the liquid crystal cell and the second polarizing plate, and wherein said retardation layers of each of two said compensation structures comprise an uniaxial retardation layer of the negative A-plate type, the fast axis of which is substantially parallel to the absorption axis of the first polarizing plate. In yet another embodiment of the liquid crystal display, the first polarizing plate further comprises at least one layer of triacetyl cellulose (TAC). In still another embodiment of the present invention, each of the first and second polarizing plates further comprises at least one layer of triacetyl cellulose (TAC).

In still another embodiment of the liquid crystal display, each of the first and second polarizing plates further comprises at least one layer of triacetyl cellulose (TAC), and said retardation layer comprises an uniaxial retardation layer of the negative A-plate type, the fast axis of which is substantially parallel to the absorption axis of the first polarizing plate.

In another embodiment of the liquid crystal display, said retardation layer comprises a biaxial retardation layer of the negative AB-plate type, and each of the first and second polarizing plates further comprises at least one layer of tri-acetyl cellulose (TAC).

In yet another embodiment of the liquid crystals display, the compensation structure of which comprises the biaxial retardation layer, said biaxial retardation layer is characterized by the layer thickness d, two in-plane refractive indices corresponding to a fast optical axis and a slow optical axis (nf and ns, respectively), and one refractive index (nn) in the normal direction, which obey the following condition for electromagnetic radiation in the visible spectral range: ns>nf and d·|nn−ns|<5 nm.

In yet another embodiment of the liquid crystals display, the compensation structure of which comprises the biaxial retardation layer, said biaxial retardation layer is characterized by two in-plane refractive indices corresponding to a fast optical axis and a slow optical axis (nf and ns, respectively), and one refractive index (nn) in the normal direction, which obey the following condition for electromagnetic radiation in the visible spectral range: ns>nn>nf.

A more complete assessment of the present invention and its advantages will be readily achieved as the same becomes better understood by reference to the following detailed description, considered in connection with the accompanying drawings and detailed specification, all of which forms a part of the disclosure. The subject of the invention is illustrated by the following Figures, of which:

FIG. 1 shows the orientation of principal axes of the dielectric tensor in the general case of optically anisotropic media.

FIG. 2 shows the orientation of the principal dielectric tensor axes in the case of a negative AB-plate compensator.

FIG. 3 shows the orientation of the principal dielectric tensor axes in the case of a negative A-plate compensator.

FIG. 4 shows the orientation of the principal dielectric tensor axes in the case of a positive C-plate compensator.

FIG. 5 shows the orientation of the principal dielectric tensor axes in the case of a negative C-plate compensator.

Figure 7:
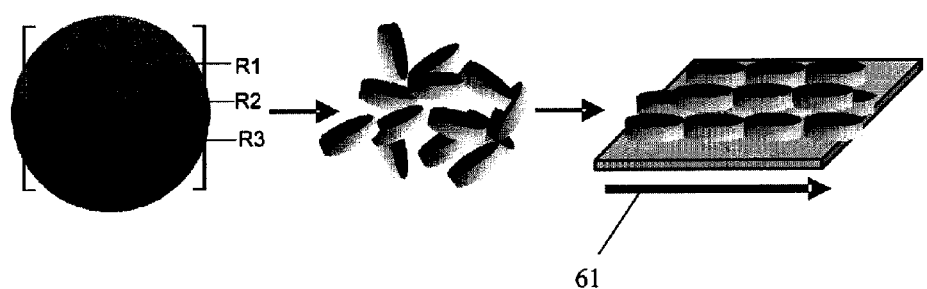

FIG. 7 demonstrates the molecular structure and molecular packing that correspond to a negative C-plate formation.

Figure 8:
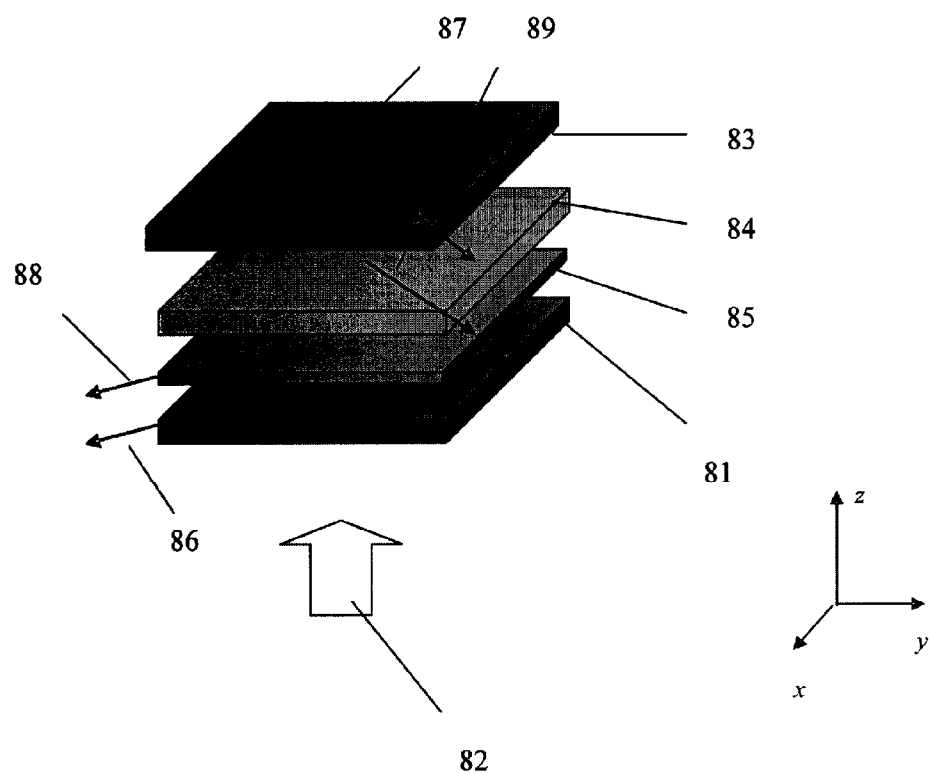

FIG. 8 schematically shows an IPS mode LCD according to the embodiment of the present invention.

Figure 9:
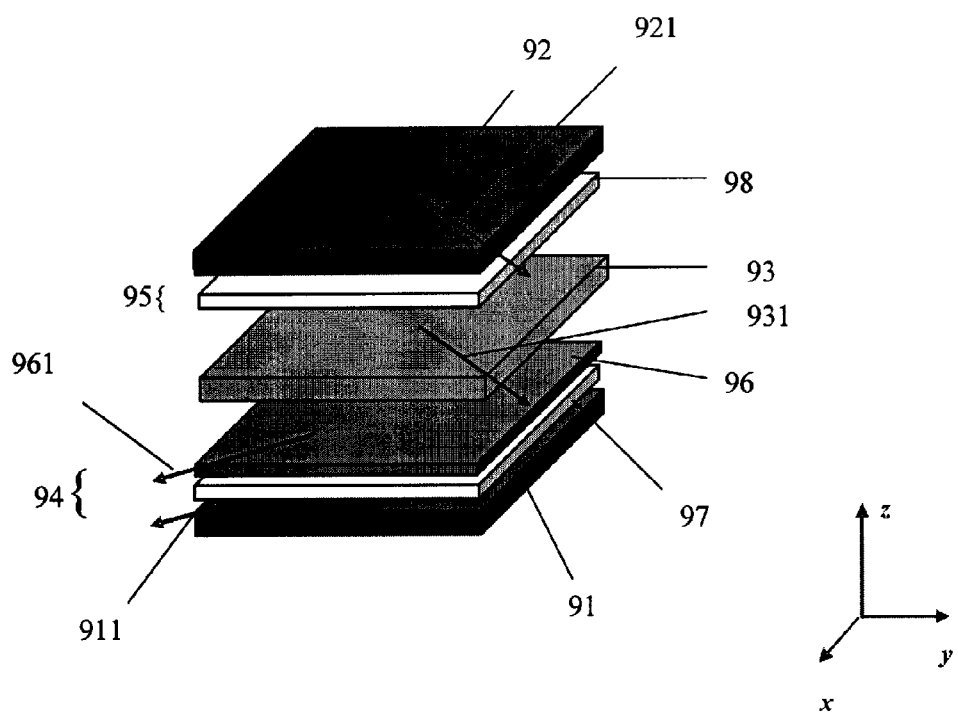

FIG. 9 schematically shows an IPS mode LCD design according to another embodiment of the present invention.

Figure 10:
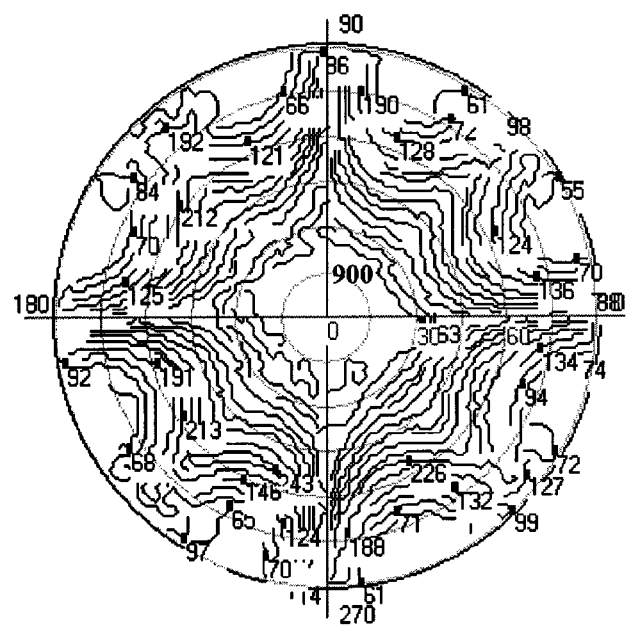

FIG. 10 illustrates the performance (viewing angle contrast ratio map) of the optimized IPS LCD design at wavelength of 550 nm.

Figure 11:
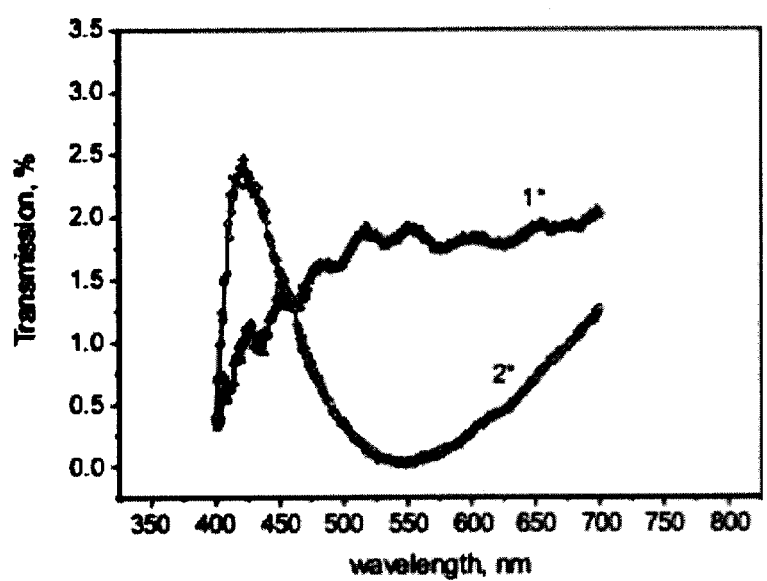

FIG. 11 shows experimental transmission spectra in black state for the IPS LCD design.

Figure 12:
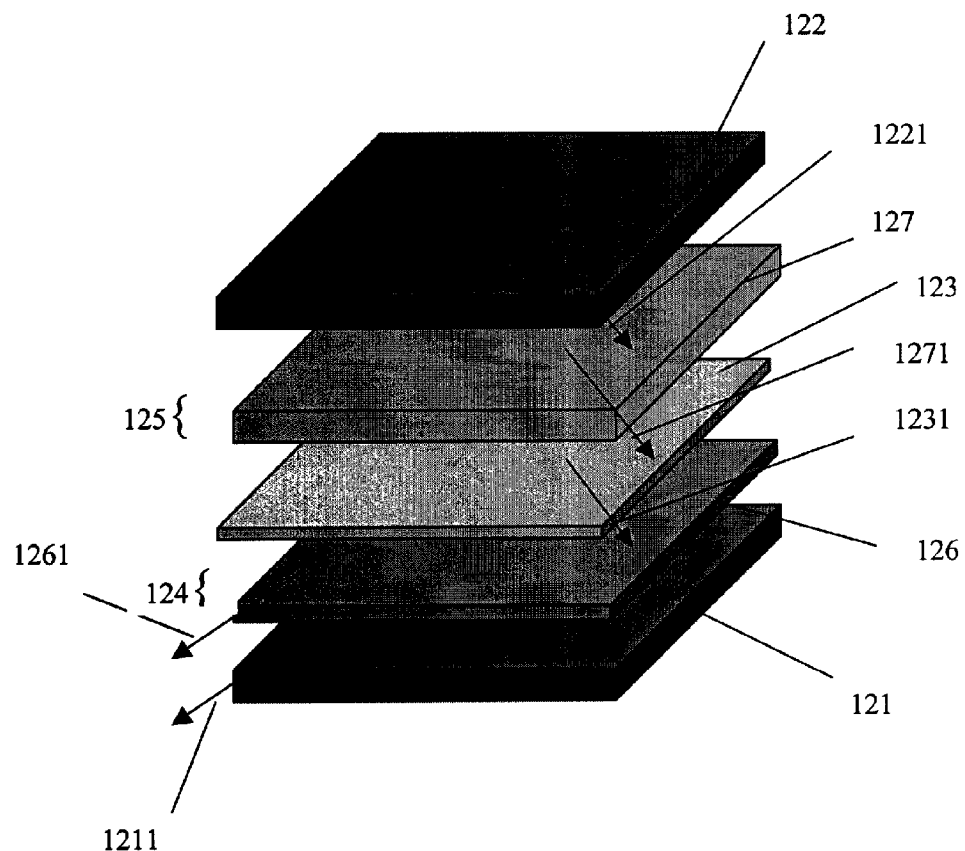

FIG. 12 schematically shows an IPS LCD design according to another embodiment of the present invention.

Figure 13:
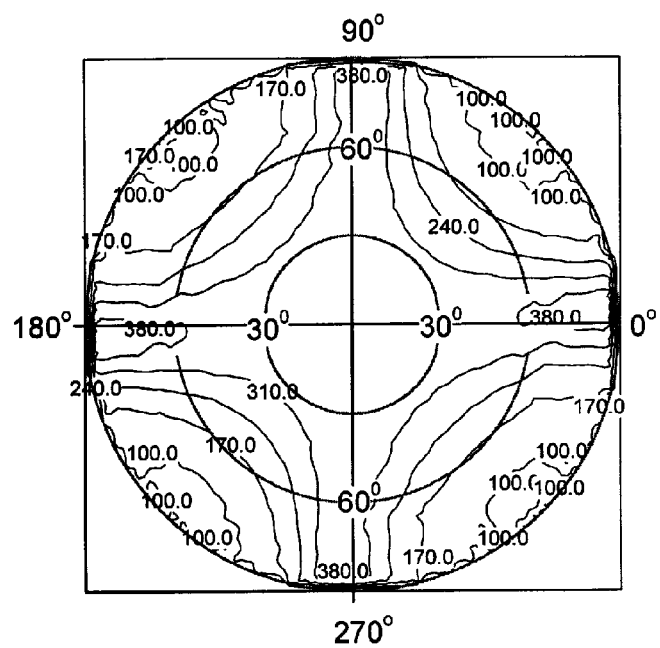
Figure 14:
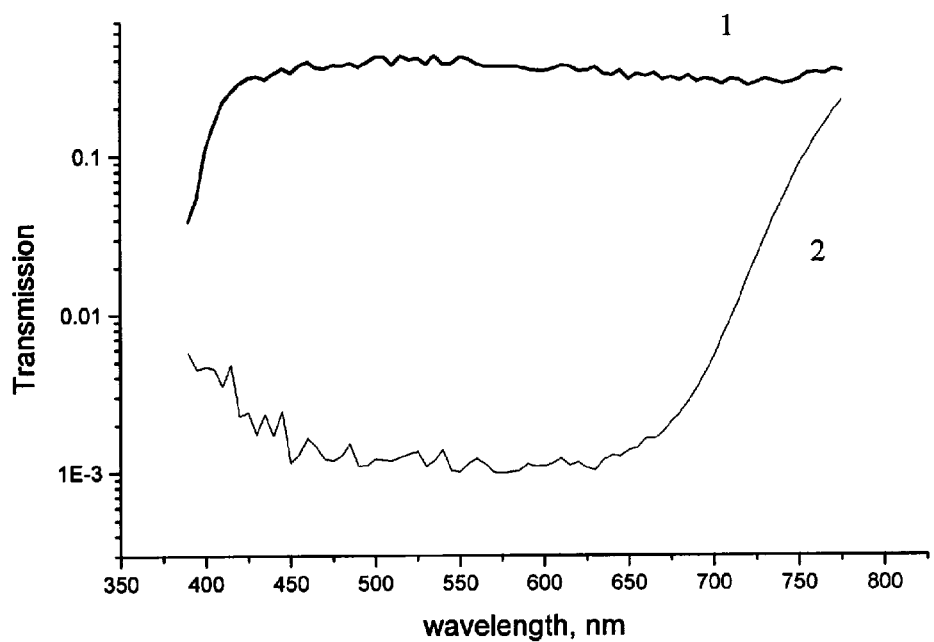
Figure 15:
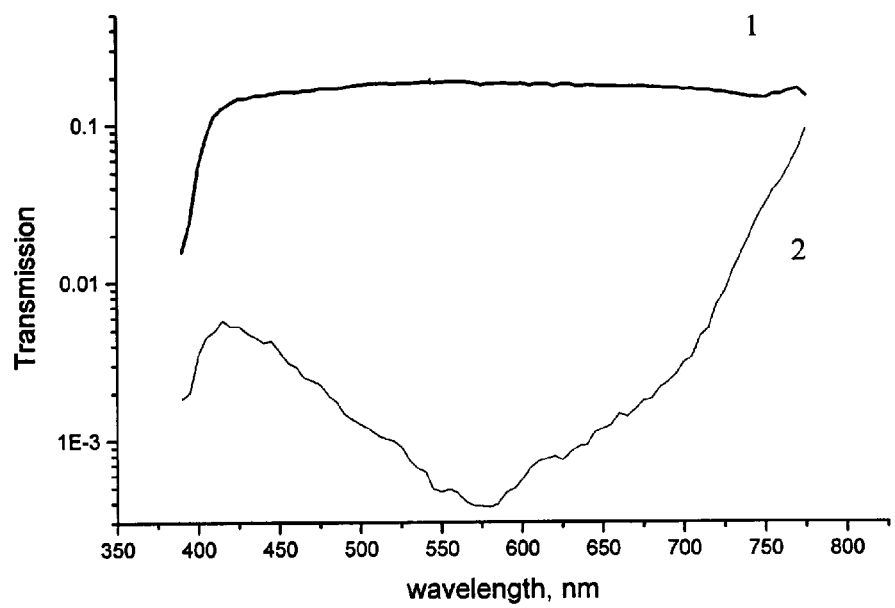

FIG. 13 shows an experimental viewing angle diagram of an IPS LCD design according to another embodiment of the present invention;

FIG. 14 shows the transmission spectra of an optimized IPS LCD design at normal light incidence according to the present invention;

FIG. 15 shows the transmission spectra of an optimized IPS LCD according to the present invention at oblique light incidence (80 deg).

Figure 16:
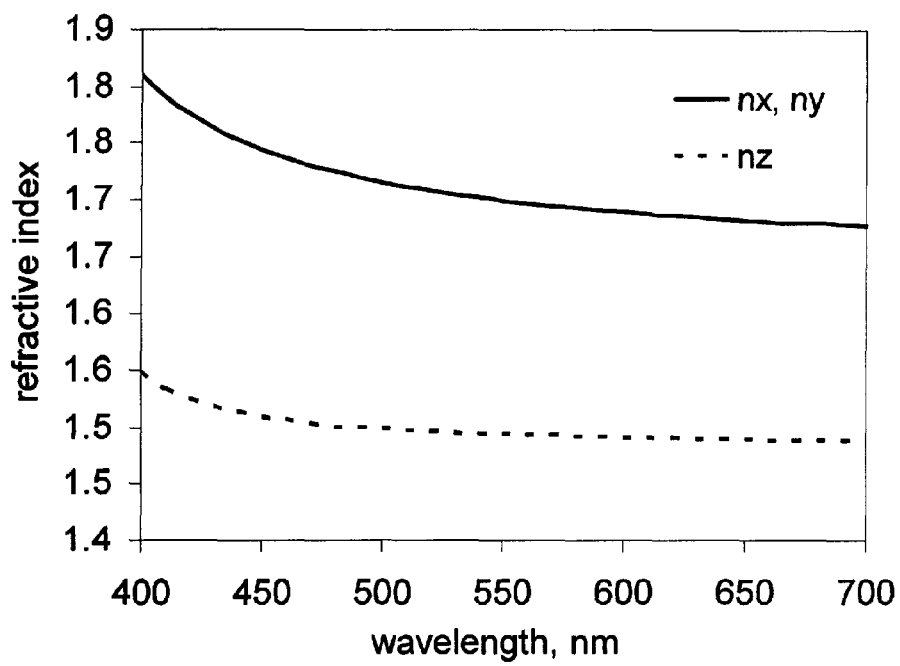
Figure 17:
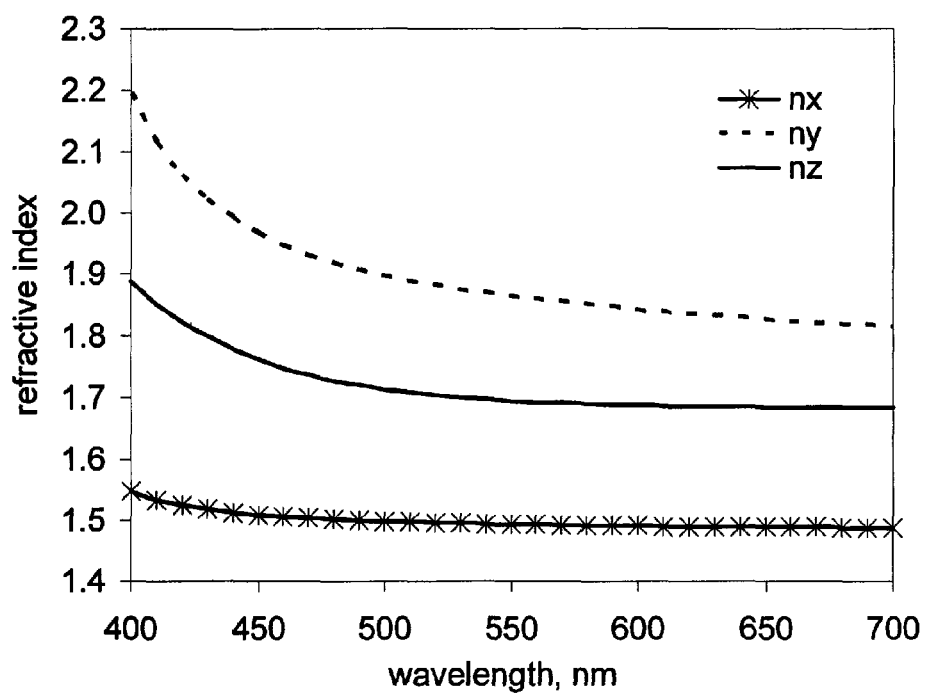

FIG. 16 shows the spectral dependences of the principal refractive indices of a negative C-type thin birefringent film;

FIG. 17 shows the spectral dependences of the principal refractive indices of a biaxial BA-type thin birefringent film.

DEFINITION OF TERMS

Any nonmagnetic (magnetic permittivity μ=1) optically anisotropic medium is characterized by its second rank dielectric tensor. The classification of retardation plates is tightly connected to the orientation of the principal axes of a particular dielectric tensor with respect to the natural coordinate frame of the plate. The natural xyz coordinate frame of the plate is oriented so that the z axis is parallel to the normal direction.

Figure 1:
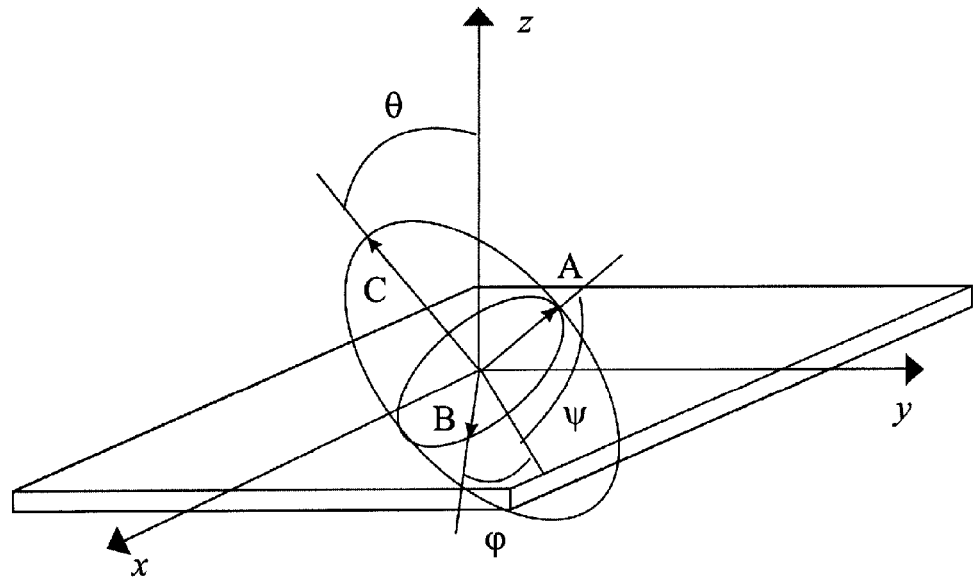
FIGS. 1 to 5 are described hereinabove as illustrations to prior art.

The orientation of the principal axes can be characterized by three Euler angles (θ, φ, ψ,), which, together with the principal dielectric tensor components ($\in_A, \in_B, \in_C$) uniquely define the optical retardation plates of various types (FIG. 1). The case when all principal components of the dielectric tensor are different corresponds to a biaxial plate. In this case, the plate has two optical axes. For example, in a plate with $\in_A < \in_B < \in_C$, these optical axes are in the plane of axes C and A, on both sides from axis C.

Figure 2:
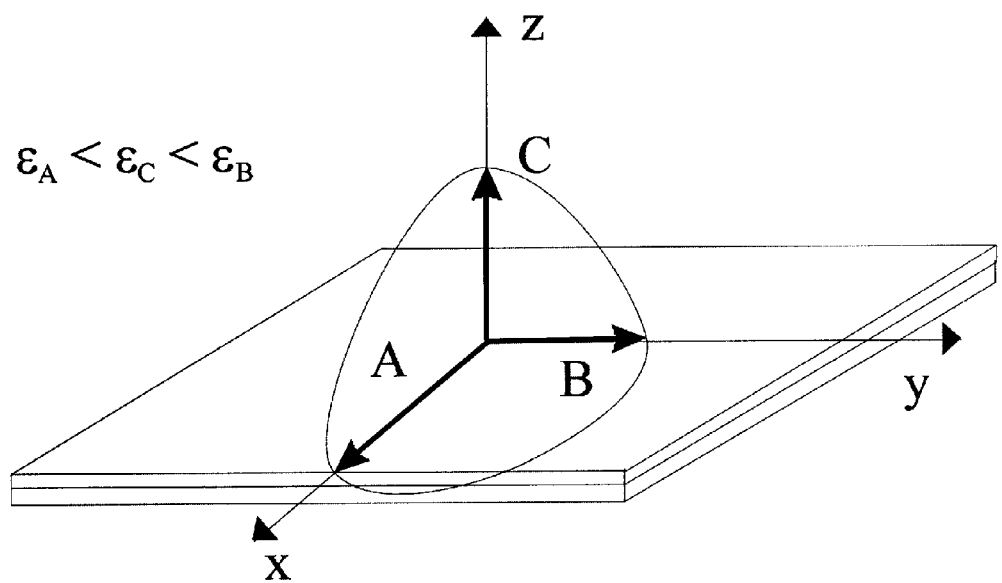

In an important particular case, the two principal axes A and B of the dielectric tensor lie in the plane of the plate, while axis C is perpendicular to this plane. The x, y and z axes of the laboratory frame can be chosen coinciding with axes A, B and C, respectively. If, for instance, the minimum and maximum values among the three principal components $\in_A, \in_B$ and $\in_C$ of the dielectric permittivity tensor correspond to the A and B axes, respectively, then $\in_A < \in_C < \in_B$, and the two optical axes belong to the AB plane. For this reason, such retardation layer is referred to as the AB or BA type retarder, respectively (FIG. 2). For $\in_A - \in_B < 0$, the negative AB plate is equivalent to the positive BA plate (inversion of the order of letters changes the sign of the dielectric permittivity difference: $\in_B - \in_A > 0$). Another basically different case corresponds to two axes belonging to the plane perpendicular to the plate surface. This case is realized when the minimum or maximum value of one of the principal permittivity components corresponds to axis C. For instance, in the case of $\in_C < \in_B < \in_A$, this retarder is referred to as the negative CA or positive AC plate.

In the uniaxial limit when $\in_C = \in_B$, we have a degenerate case when these two axes coincide with axis A that is just a single optical axis. Such plate is called "A-plate".

Figure 3:
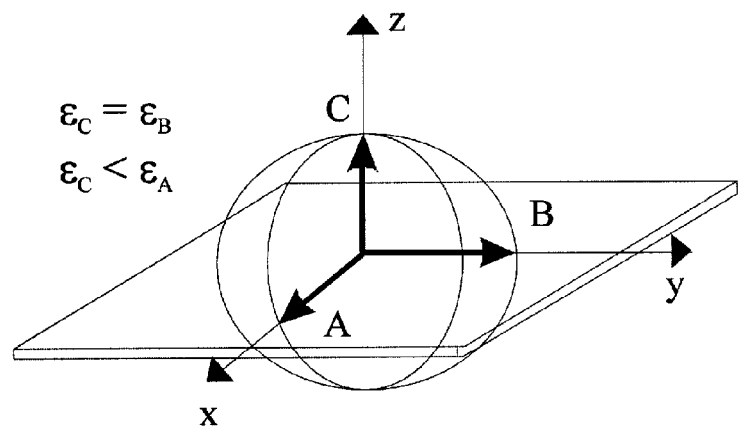

In the case of $\in_C = \in_B < \in_A$ the plate is called positive A-plate. On the contrary, if $\in_C = \in_B > \in_A$, the plate is defined as the negative A-plate (FIG. 3).

Figure 4:
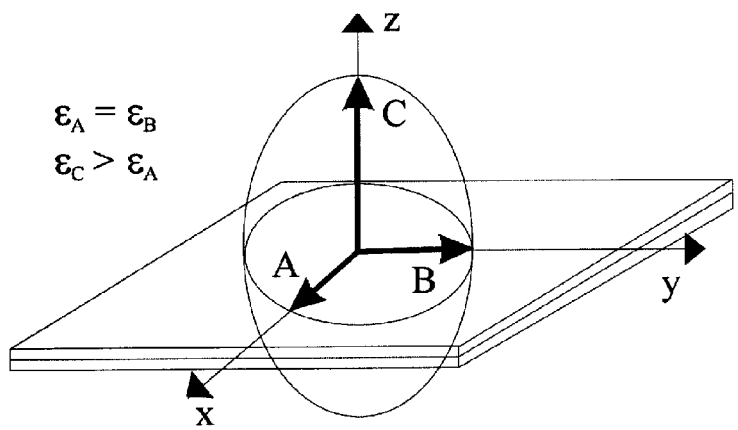
Figure 5:
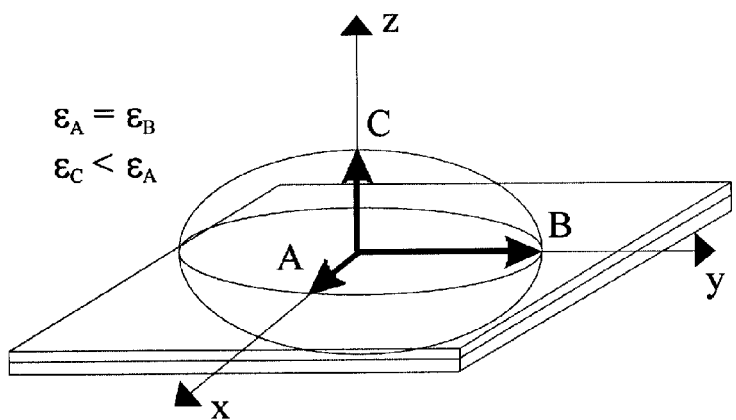

Uniaxial C-Plate is defined by values $\in_A = \in_B \neq \in_C$. Thus, the principal axis C which is normal with respect to the plate surface (xy plane) is also the optical axis. In a case of $\in_A = \in_B < \in_C$ the plate is called positive C-plate (FIG. 4). On the contrary, if $\in_A = \in_B > \in_C$ the plate is called negative C-plate (FIG. 5).

The disclosed compensation structure for the IPS LCD comprises at least one retardation layer of supramolecules involving at least one polycyclic organic compound with a conjugated π-system and functional groups, capable of forming non-covalent bonds between said supramolecules. These bonds usually represent hydrogen bonds (H-bonds) or coordination bonds.

A condition is the presence of a developed system of π-conjugated bonds between conjugated aromatic rings of the molecules and the presence of groups lying in the plane of the molecule and involved into the aromatic system of bonds. The molecules or their molecular fragments possess a planar structure and are capable of forming supramolecules in solution. Another necessary condition is the maximum overlap of u orbitals in the stacks of supramolecules.

There are two tasks for the molecular engineering of the final film structure. The first task is to design a macroscopic structure that supports desirable optical functions via certain values of the three principal refraction indices. The second task is to design molecules with the required self-assembly properties, which would provide the necessary supramolecular structure with desired orientation and spatial homogeneity of the optical parameters of the film. The process of film deposition consists in printing or wet coating a liquid self-assembling material with subsequent drying, which converts the liquid coating material into an oriented nanostructural film.

The typical coating procedures based on roll-to-roll slot die or micro-grooved rod methods favor a preferential in-plane direction of molecular orientation, which is not coinciding with the film normal.

Figure 6:
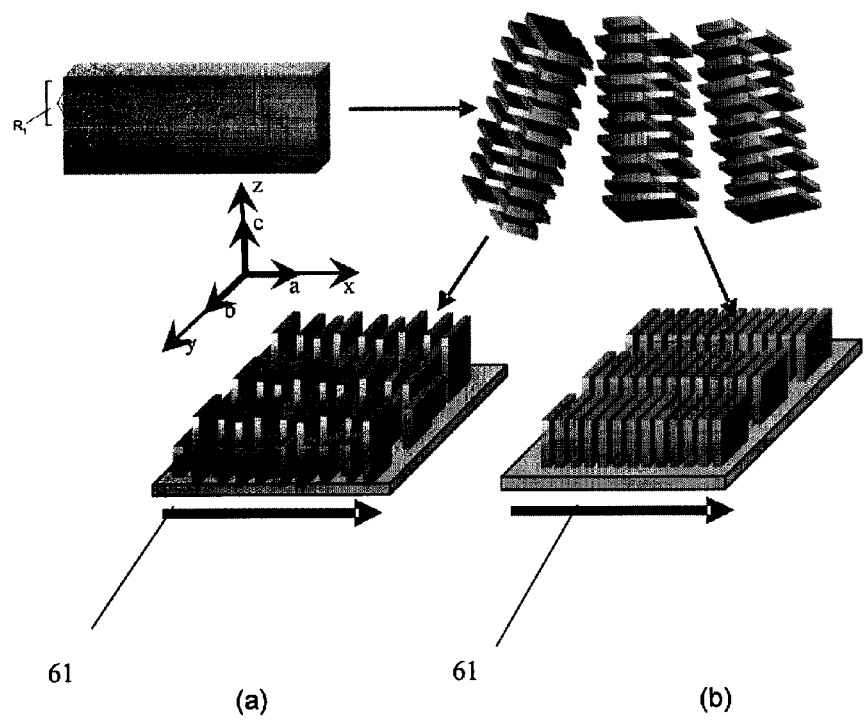
FIG. 6 is a simplified diagram of supramolecular packing in the solution and in the dry film with respect to the substrate plane for the (a) negative A-plate and (b) negative biaxial AB-plate.

FIG. 6 shows a simplified diagram of molecular and supramolecular packing in solution and in dried films with respect to the substrate planes for (a) negative A plate and (b) negative biaxial plate. The arrow 61 shows the coating direction. In solution, the molecules are assembled in stacks (supramolecules) and can form a lyotropic liquid crystal in the nematic phase. The supramolecules have a rod-like shape. During the deposition, the stacks are oriented under the action of a shear stress. The result is an ordered film with stacks aligned in the substrate plane along the coating direction.

At the same time, there is a different approach to the formation of negative C-plates. There are compounds consisting of flat molecules with specific intermolecular interactions, which are oriented by the substrate surface so their planes are substantially parallel to the surface of the retardation layer (FIG. 7).

In the course of preparation of a solution of such an his organic compound (for example an acenaphthoquinoxaline derivative, a 6,7-dihydrobenzimidazo[1,2-c]quinazolin-6-one derivative, a polyphenyl derivative, etc.), the heterocyclic molecular systems and binding groups form flat anisometric particles (kinematic units) due to noncovalent chemical bonds between the binding groups of adjacent molecular systems. The supramolecules have a planar shape. During the application of a reaction mixture to a substrate, a certain fraction of these flat anisometric particles are destroyed because of the rupture of weak noncovalent bonds. This destruction reduces viscosity of the reaction mixture and facilitates its orientation by the hydrodynamic flow. The planes of anisometric particles are oriented parallel to the substrate surface (due to the hydrophilic properties of the heterocyclic molecular systems, which produces their effective homeotropic alignment). Then, the ruptured noncovalent chemical bonds in the anisometric particles are restored.

In one preferred embodiment, the retardation layer has at least partially crystalline structure.

The thickness of the retardation layer usually does not exceed approximately 1 micron. The film thickness can be controlled by changing the content of a solid substance in the applied solution and by varying the layer thickness.

The retardation layer material is usually converted into a water-insoluble form, which is achieved by treatment of the film with a solution containing di- or trivalent metals ions and/or by an appropriate heat treatment.

The selection of raw materials for manufacturing the compensator must take into account the spectral characteristics of these compounds and the structure of their molecules.

The retardation layers formed using the organic compounds of a general structural formula (I) are well suited for the creation of optical compensators for liquid crystal displays, although the present invention is not limited to using only these compounds.

The present invention expands the assortment of compounds which can be either not absorbing or only weakly absorbing in the visible spectral region and capable of forming well-ordered three-dimensional structures.

The in-plane switching type liquid crystal display according to the present invention (FIG. 8), comprises: (a) a first polarizing plate 81 (closest to the back light source 82) and a second polarizing plates 83 facing each other and spaced from each other; (b) a liquid crystal cell 84 situated between said first and second polarizing plates, with the orientation of director of the liquid crystal layer of said cell being controlled by an electric field parallel to the polarizing plates; and (c) a compensation structure 85 located between the liquid crystal cell and the first polarizing plate 81.

The first and second polarizing plates have transmission axes (86 and 87, respectively) which are perpendicular to each other, and the compensation structure comprises at least one retardation layer like that described above. For the given orientations of optical axes, the order of elements with respect to the light source is of key importance.

In one preferred embodiment, the compensation structure 85 possesses the properties of a negative AB-plate.

The compensating structures 85 includes a retardation layer with fast axis 88 lying substantially in the plane of said layer and parallel to the absorption axis 86 of the first polarizing plate. The optical axis 89 (slow axis) of the LC layer 84 is parallel to the absorption axis 87 of the second polarizing plate.

Still another embodiment of the liquid crystal display of the present invention is schematically shown in FIG. 9. The IPS LCD comprises the first polarizing plate 91, the second polarizing plate 92, liquid crystal cell 93 situated between said first and second polarizing plates, and compensation structure 94 located between the liquid crystal cell and the first polarizing plate 91. The IPS LCD further comprises an additional compensation structure 95 located between the liquid crystal cell and the second polarizing plate 92. The first and second polarizing plates have absorption axes (911 and 921, respectively), which are perpendicular to each other.

The compensation structure comprises a biaxial retardation layer 96 of the negative AB-plate type, which is located closer to the liquid crystal cell 93, and a uniaxial retardation layer 97 of the negative C-plate type located closer to the first polarizing plate 91.

The spectral dependences of the principal refractive indices of negative C- and BA-type thin birefringent films are shown in FIGS. 16 and 17, respectively. For the C-type film, the value $n_z$ corresponding to the principal dielectric tensor axis along the film normal, is much lower than the in-plane refraction coefficients $n_x=n_y$. The birefringence is rather large ($n_x-n_z=0.18$ at $\lambda=550$ nm) and significantly increases at shorter wavelengths.

For the BA-type thin birefringent film, all the three principal refractive indices are different: $n_x=1.49$, $n_y=1.86$, $n_z=1.69$ at $\lambda=550$ nm (FIG. 17). The lowest ($n_x$) and highest ($n_y$) values correspond to the principal dielectric tensor axes A and B respectively; the x axis (the laboratory XYZ, as in FIG. 9) is directed along the film application direction.

The additional compensation structure comprises an uniaxial retardation layer 98 of the negative C-plate type. The biaxial retardation layer 96 has principal axis of lowest refraction index 961 lying substantially in the plane of said retardation layer and parallel to the absorption axis 911 of the first polarizing plate. The optical axis 931 (slow axis) of the LC layer 93 is parallel to the absorption axis 921 of the second polarizing plate 92.

In this example the liquid crystal material has a negative dielectric anisotropy ($\epsilon_{\|}-\epsilon_{\perp}=-3.5$) and low birefringence ($\Delta n \approx 0.08$). The elastic moduli of LC have typical values: $K_{11}=10$ pN, $K_{22}=5$ pN and $K_{33}=15$ pN. With such values, the state with maximum transmission coefficient is achieved at an applied voltage of 5-8 V. The planar alignment in the IPS cell is achieved using typical polyimide material providing pretilt angle of a few degrees with respect to the substrate plane. In general case the thickness d of the IPS cell is chosen taking into account the LC optical anisotropy $\Delta n$ in order to provide a cell retardation of $\Delta n d \approx 275$ nm.

The performance of this optimized IPS design is illustrated in FIG. 10. At $\lambda=550$ nm, the contrast ratio of about 100 can be achieved even for a very oblique angles of ~85° relative to the normal. FIG. 11 shows experimental spectra of the transmission coefficient at an incidence angle of 60° for non-compensated (plot 1*) and compensated IPS design (plot 2*) in the field-OFF state. These data illustrate the compensation effect in sense of suppressing the light leakage in spectral range of 500-600 nm, where the human eye has a highest sensitivity.

The optical scheme of still another IPS LCD design is shown in FIG. 12. The IPS LCD comprises the first polarizing plate 121, the second polarizing plate 122, the liquid crystal cell 123 situated between said first and second polarizing plates, and a compensation structure 124 located between the liquid crystal cell 123 and the first polarizing plate 121. This IPS LCD further comprises an additional compensation structure 125 located between the liquid crystal cell 123 and the second polarizing plate 122. The compensation structure 124 comprises the first uniaxial retardation layer 126 of the negative A-plate type and the additional compensation structure 125 with the second uniaxial retardation layer 127 of the negative A-plate type. For a given orientation of optical axes, the order of elements with respect to the light source is of key importance. The absorption axis 1211 of the first polarizer and the principal axis 1261 of the lowest refraction of the first A-plate must coincide. In the field-OFF state, the LC layer has a homogeneous planar orientation. The LC alignment layers should provide close to zero LC director pretilt angle. The LC director 1231 (slow optical axis) should be perpendicular to the absorption axis of the first polarizer in the field-OFF state. The in-plane electrodes must provide the in-plane electric field at an angle of 45 degrees with respect to the field-OFF orientation of the LC director (the rubbing of the LC alignment layers must be at 45° with respect to the in-plane electrode stripes). The absorption axis 1221 of the second polarizer and the principal axis of lowest refraction index for the 1271 of the lowest refraction index of the second A-plate must also coincide.

The LC layer contains a material with standard properties available on the market: dielectric anisotropy $\Delta \epsilon = \epsilon_{81} - \epsilon_{\perp}=10$; refractive index at $\lambda=400$ nm $n_{81}=1.62$; refractive index at $\lambda=400$ nm $n_{\perp}=1.5$; refractive index at $\lambda=700$ nm $n_{81}=1.59$; refractive index at $\lambda=700$ nm $n_{\perp}=1.5$. The dispersion of the optical anisotropy $d(\Delta n)/d\lambda \sim 10^{-4}$ nm$^{-1}$ is typical of LC materials with low optical anisotropy ($\Delta n \sim 0.1$). The thickness of the LC layer should be about 2.5 microns (the LC layer is close to $\lambda/2$ plate in the field-ON state at $\lambda=550$ nm).

The first negative A-plate 126 possesses the following properties: thickness, 0.5 microns; refractive indices ($n_A$, $n_B$, $n_C$)=(1.7, 1.7, 1.5). For the particular polarizers and LC, this plate should be made of a material with minimum possible spectral dispersion of the refractive indices.

The second negative A-plate 127 possesses the following properties: thickness, 0.85 microns; refractive indices ($n_A$, $n_B$, $n_C$)=(1.75, 1.75, 1.5) at $\lambda=400$ nm; refractive indices ($n_A$, $n_B$, $n_C$)=(1.7, 1.7, 1.5) at $\lambda=550$ nm; refractive indices ($n_A$, $n_B$, $n_C$)=(1.68, 1.68, 1.5) at $\lambda=700$ nm.

For the particular polarizers and LC material, the second plate should provide normal spectral dispersion of the refractive indices. The optimum value of the optical anisotropy dispersion is about $3\times10^{-4}$ nm$^{-1}$. This dispersion results in good optical compensation over a wide spectral range (see the results below).

In the optical compensation, the second negative A-plate plays a double role. First, it provides partial optical compensation of the LC layer. Second, because of this partial optical compensation, the system consisting of the LC layer and this A-plate becomes equivalent to an effective positive A-plate with a low optical retardation. As a result, in the field-ON state, the first negative A-plate together with the system of the LC layer plus second A-plate make the total compensation of the polarizers and removes the light leakage at oblique viewing angles. For proper parameters, this optical design results in perfect black appearance in the field-OFF state independently of the viewing angle. Another very important property of the system consisting of LC layer and second negative A-plate is that, in the case of an LC material having lower spectral dispersion than that of the A-plate, the effective positive A-plate is characterized by anomalous spectral dispersion that provides compensation over a wide spectral range.

The viewing angle properties illustrated in FIG. 13 can be characterized as a very good one and basically limited by O-polarizer performance. The spectral performance is fine and almost independent on the viewing angle (FIGS. 14 and 15). FIG. 14 shows the transmission spectra of the IPS LCD design at normal light incidence in the field-ON (plot 1) and field-OFF (plot 2) states. FIG. 15 shows the transmission spectra of the IPS LCD design at oblique light incidence (q=80 deg) in the field-ON (plot 1) and field-OFF (plot 2) states.

The color coordinates (in case of the D65 light source (0.314, 0.356) and (0.325, 0.357) for normal incidence and oblique incidence (80 deg), respectively) are close to those of white source. The color shift is rather small even for the viewing angle changed from zero to 80 deg. The field-OFF performance (black state) is basically limited by the performance of polarizers.

The present invention is not limited to using only the aforementioned IPS LCD designs. Table B shows some designs realized according to the present invention. Here, the notation is as follows: $P_{45}$—the polarizer with the transmission axis at 45°; $LC_{45}$—planar LC layer aligned with the director at 45°; $A^-B_{-45}$—the negative biaxial AB-plate with the principal axis of lowest refraction at −45°; $A^-_{-45}$—the negative uniaxial A-plate with principal axis of lowest refraction at −45°; TAC—the layer of triacetyl cellulose. The LC layer in-plane retardation is 275 nm. The in-plane driving electric field vector is at zero degrees.

$$\Delta n_{xy} d_{RL} = (n_x - n_y) d_{RL},$$

$\Delta n_{xz} d_{RL} = (n_x - n_z) d_{RL}$, where $d_{RL}$ is the thickness of the retardation layer.

The IPS LCD is optimized for the wavelength of 550 nm.

TABLE B

| Design | Rth (TAC) $\Delta n d_{TAC}$, nm | Ro (COATING) $\Delta n_{xy} d_{RL}$, nm | Rth (COATING) $\Delta n_{xz} d_{RL}$, nm |
|---|---|---|---|
| $P_{45} A^- B_{-45} $ TAC $LC_{45} P_{-45}$ | 0 | −250 | −138 |
| $P_{45} A^-_{-45}$ TAC $LC_{45} P_{-45}$ | −70 | −150 | −150 |
| $P_{45}$ TAC $A^-_{-45} LC_{45} P_{-45}$ | −70 | −150 | −150 |
| $P_{45} A^-_{-45} LC_{45} A^-_{-45} P_{-45}$ | 0 | −155(A − 45) −80(A− −45) | −155(A − 45) −80(A− −45) |
| $P_{45}$ TAC $A^-_{-45}$ TAC $LC_{45}$ TAC $P_{-45}$ | −50 | −150 | −150 |
| $P_{45}$ TAC $A^- B_{-45} LC_{45}$ TAC $P_{-45}$ | −50 | −112 | −65 |

The IPS LCD with a compensator setup disclosed by the present invention shows better contrast-view angle properties in comparison with the traditional scheme. In order that the invention may be more readily understood, reference is made to the following examples, which are intended to be illustrative of the invention, but are not intended to be limiting in scope.

EXAMPLE 1

This example describes the preparation of an organic retardation layer. A mixture of 6-oxo-3-sulfo-5,6-dihydrobenzimidazo[1,2-c]quinazoline-10-carboxylic acid and 6-oxo-3-sulfo-5,6-dihydrobenzimidazo[1,2-c]quinazoline-9-carboxylic acid (1 g) was stirred for 1 h at a temperature of 20° C. in a mixture of 15.0 ml of deionized water with 0.6 ml of a 10% aqueous ammonia solution until a lyotropic liquid crystal solution was formed. The obtained solution was applied at a temperature of 20° C. and a relative humidity of 65% onto the substrate surface with a Mayer rod #2.5 moved at a linear velocity of 15 mm/s. The substrate was made of triacetyl cellulose (TAC). Then, the organic retardation layer was dried at the same humidity and temperature. In order to determine the optical characteristics of the organic retardation layer, thickness, optical retardation and transmission spectra were measured in a wavelength range from approximately 400 to 700 nm using Dektak3ST, Axometrics and Cary 500 Scan spectrophotometer respectively. The optical transmission of the organic retardation layer was measured using light beams linearly polarized parallel and perpendicular to the coating direction (Tpar and Tper, respectively). The obtained data were used to calculate the refractive indices (nf, ns, and nn). The obtained retardation layer was anisotropic (nf<ns≈nn). The fast principal axis is parallel to the coating direction (ab), and the slow principal axis is perpendicular to the coating direction (ab). The two in-plane refractive indices (nf and ns) and one refractive index (nn) in the normal direction obey the following conditions for electromagnetic radiation in the visible spectral range: Δnfs=Δnfn=0.328 at λ=633 nm; Δnfs=Δnfn=0.332 at λ=550 nm; Δnfs=Δnfn=0.338 at λ=450 nm, where Δnfs=ns−nf, Δnfn=nn−nf. The measurements showed substantially small values of the absorption coefficients of the organic retardation layer in a visible spectral range of 380-780 nm.

EXAMPLE 2

The example describes preparation of organic compound having general structural formula 42 shown in Table 6. A 4,4'-(5,5-Dioxidodibenzo[b,d]thiene-3,7-diyl)dibenzenesulfonic acid was prepared by sulfonation of 1,1':4',1":4",1"'-quaterphenyl.

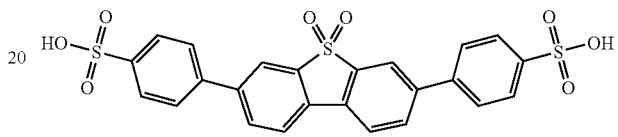

A 1,1':4',1":4",1"'-Quaterphenyl (10 g) was charged into 20% oleum (100 ml). Reaction mass was agitated for 5 hours at ambient conditions. After that the reaction mixture was diluted with water (170 ml). The final sulfuric acid concentration became ~55%. The precipitate was filtered and rinsed with an acetic acid (~200 ml). Filter cake was dried in oven at ~110° C. The process yielded 8 g of 4,4'-(5,5-Dioxidodibenzo[b,d]thiene-3,7-diyl)dibenzenesulfonic acid. H1NMR (Brucker Avance-600, DMSO-d6, δ, ppm): 7.735 (d, 4H, 4CHAr(3,3',5,5')); 7.845 (d, 4H, 4CHAr(2,2',6,6')); 8.165 (dd, 2H, 2CHAr(2,8)); 8.34 (m, 4H, 4CHAr(1,9,4,6)). The electron spectrum (Spectrometer UV/VIS Varian Cary 500 Scan, aqueous solution): λmax1=218 nm (∈=3.42*104); λmax2=259 nm (∈=3.89*104); λmax3=314 nm (∈=4.20*104). Mass spectrum (Brucker Daltonics Ultraflex TOF/TOF): molecular ion (M−=529), FW=528.57.

EXAMPLE 3

The example shows the preparation of organic thin biaxial layer formed from lyotropic liquid crystal solution. A 4,4'-(5,5-Dioxidodibenzo[b,d]thiene-3,7-diyl)dibenzenesulfonic acid (1 g) obtained as described in Example 4 was mixed with 3.8 ml of distilled water and 1.1 ml of 10-w % aqueous sodium solution and then stirred at room temperature (23° C.) until a lyotropic liquid solution was formed (for about 1 hour).

LCD-grade Soda Lime glass substrates were prepared for coating. The substrate was placed in Ultrasonic bath with water solution of NaOH (w/w 10%) and KMnO4 (w/w 0.1%) for 30 min, then rinsed with deionized water, and subjected to compressed air stream drying. The lyotropic liquid crystal was coated onto the pretreated glass substrate with Mayer Rod #1.5 moved at linear velocity of 200 mm/s (humidity=30%, temperature=23° C.). The coated solution was subjected to compressed air stream drying and thin retardation layer of the first type was formed as the result. The thickness of retardation layer formed was between 420 and 450 um, but it depends on the desired optical function and may vary controlling the concentration of compound in the water solution. The retardation layer formed is clear (colorless) and transparent in the optical spectral range. The retardation layer based on material as shown in this Example is characterized by fast principal axis lying in the layer plane along the coating direction. The slow principal axis lies in the layer plane also and is directed perpendicularly to the coating direction. The refractive indices directed along the fast principal axis (nf), along slow principal axis (ns), and along the perpendicular direction relative to layer plane (nn) are found to be different. In solution the molecules are assembled in rod-like supramolecules and can form lyotropic liquid crystal (LLC) in nematic phase. Said rod-like supramolecules have anisotropic polarizability in plane (u0w) which is perpendicular to their longitudinal axis directed along 0v-axis. During the deposition process the supramolecules are oriented under shear stress. The result is a retardation layer with supramolecules aligned in plane of a substrate along the coating direction.

EXAMPLE 4

The example describes syntheses of the mixture of bisbenzimidazo[1',2':3,4;1",2":5,6][1,3,5]triazino[1,2-a]benzimidazole-tricarboxylic acids:

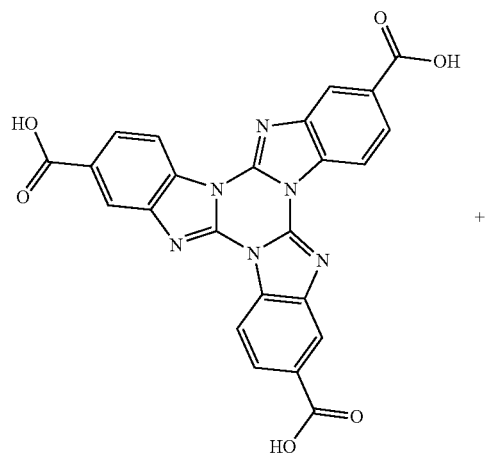

+

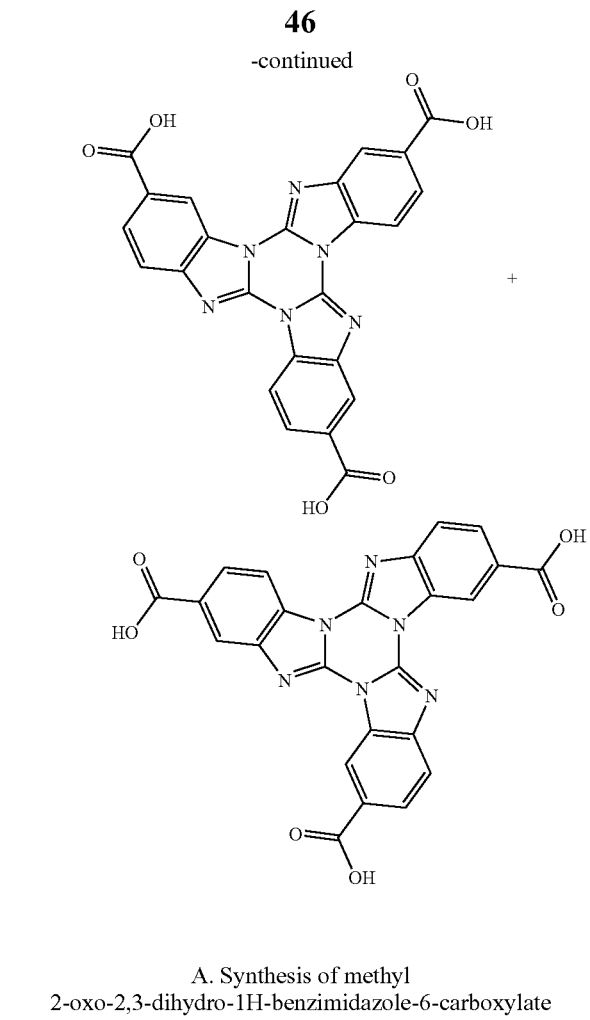

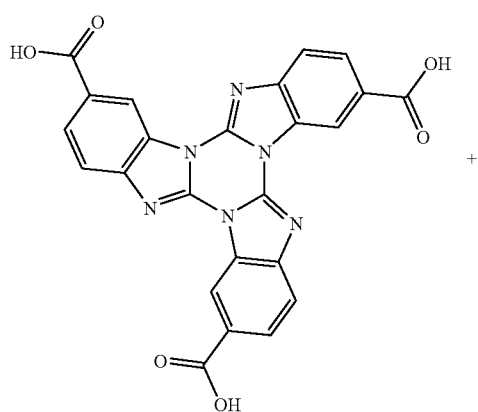

+

A. Synthesis of methyl 2-oxo-2,3-dihydro-1H-benzimidazole-6-carboxylate

Methyl 3,4-diaminobenzoate dihydrochloride (20 g, 0.08 mol) was mixed with urea (6.54 g, 0.11 mol). Reaction mixture was heated at ~150° C. for 7 hours. After cooling powder was suspended in water (400 ml) and pH of the last one was adjusted to 0.45 with hydrochloric acid. Precipitate was filtered and rinsed with water and hydrochloric acid (pH=1.5). Obtained filter cake was dried at ~100° C. Yield 15.7 g (97%).

B. Synthesis of methyl 2-chloro-1H-benzimidazole-6-carboxylate

Methyl 2-oxo-2,3-dihydro-1H-benzimidazole-6-carboxylate (43 g, 0.22 mol) was charged into Phosphorus oxychloride (286 ml). Dry hydrogen chloride was bubbled through the boiling reaction mass for 12 hours. After cooling reaction mass was poured in mixture of ice and water (2 kg). Precipitate was filtered out. Filtrate was diluted with water (1.25 l) and ammonia solution (~800 ml). After that pH was adjusted to 5.6 with use of ammonia solution. Precipitate was filtered and rinsed with water. Yield 39.5 g (84%).

C. Synthesis of trimethyl bisbenzimidazo[1',2':3,4; 1",2":5,6][1,3,5]triazino[1,2-a]benzimidazole-tricarboxylates Methyl 2-chloro-1H-benzimidazole-6-carboxylate (38 g, 0.18 mol) was heated at 185-190° C. for 10 hours. Yield 30.3 g (96%).

D. Synthesis of bisbenzimidazo[1',2':3,4;1",2":5,6][1,3,5]triazino[1,2-a]benzimidazoletricarboxylic acids Trimethyl bisbenzimidazo[1',2':3,4;1",2":5,6][1,3,5]triazino[1,2-a]benzimidazole-tricarboxylates (30 g, 0.06 mol) was charged into 5% solution of potassium hydroxide (250 ml) and boiled for 1.5 hour. After cooling obtained solution was filtered and neutralized with hydrogen chloride solution. Then pH of solution was adjusted to 1.25 with hydrochloric acid. Precipitate was filtered, rinsed with water and dried at ~100° C. Mass spectrum (Ultraflex TOF/TOF (Bruker Daltonics, Bremen, Germany)): M/Z=480 (FW=480.39). Yield 26.3 g (95%).

EXAMPLE 5

The example describes the preparation of a retardation layer from a solution of polycyclic organic compound. 10 g of a mixture of bisbenzimidazo[1',2':3,4;1",2":5,6][1,3,5]triazino[1,2-a]benzimidazole-tricarboxylic acids obtained as in the Example 4 is dissolved in 90 g dimethylformamide and stirred at 200 Centigrade until total dissolution of the solid phase and the mixture is stirred for 1 hr under ambient conditions. Then received mixture is filtered. The soda-lime LCD quality glass slides are prepared for coating by treating in a 10% NaOH solution for 30 min, rinsing with deionised water, and drying in airflow with the aid of a compressor. The obtained isotropic solution is applied onto a glass plate with a Mayer rod #2.5 at a temperature of 20 centigrade and relative humidity of 50%. The layer is dried at the same humidity and temperature in gentle flow of a hot air. Due to specific intermolecular interactions the shear stress is not a main alignment force. As a result, during the drying stage the "flat" molecules are oriented with their plane parallel to the surface of substrate. Some kinds of post-treatment procedures (e.g. annealing) may be applied to improve molecules ordering. The obtained retardation layer is optically isotropic in the plane (nf=ns) and exhibits high retardation RC in the vertical direction. The normal refraction index nn is much lower than the in-plane refraction indices nf and ns. Said retardation layer is named a negative C-plate. Such plate results in optical retardation only for oblique incidence of light. The value of the birefringence (ns−nn) is relatively large (0.25 at λ=550 nm).

What is claimed is:

1. An in-plane switching type liquid crystal display comprising:
   (a) first and second polarizing plates facing each other and spaced from each other;
   (b) a liquid crystal cell situated between said first and second polarizing plates, and
   (c) at least one compensation structure;
      wherein the director orientation of the liquid crystal layer of said cell being controlled by an electric field parallel to the polarizing plates,
      wherein one compensating structure located between the liquid crystal cell and the first polarizing plate,
      wherein the polarizing plates have transmission axes perpendicular to each other, and
      the compensation structure comprises at least one retardation layer of supramolecules comprising at least one polycyclic organic compound with a conjugated π-system and functional groups which are capable of forming non-covalent bonds between said supramolecules,
   wherein the organic compound has a general structural formula (I)

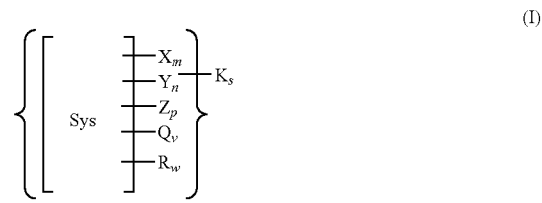

(I)

where Sys is at least partially conjugated substantially planar heterocyclic or cyclic molecular system,
X is a carboxylic group —COOH,
m is 0, 1, 2, 3 or 4;
Y is a sulfonic group —SO₃H,
n is 0, 1, 2, 3 or 4;
Z is an amide of a carboxylic acid group,
p is 0, 1, 2, 3 or 4;
Q is an amide of a sulfonic acid group,
v is 0, 1, 2, 3 or 4;
K is a counterion;
s is the number of counterions providing neutral state of the molecule;
R is a substituent selected from the list comprising CH₃, C₂H₅, NO₂, cl, BR, F, CF₃ CN, OH, OCH₃, OC₂H₅, OCOCH₃, OCN, SCN, NH₂ and NHCOCH₃, and
w is 0, 1, 2, 3 or 4;
and wherein the molecular system Sys is substantially transparent in the visible spectral range.

2. A liquid crystal display according to claim 1, wherein the molecular system Sys has a general structural formula from the list comprising structures II to XLVIII:

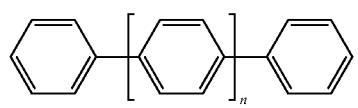

(II)

where n is the number in the range from 1 to 8

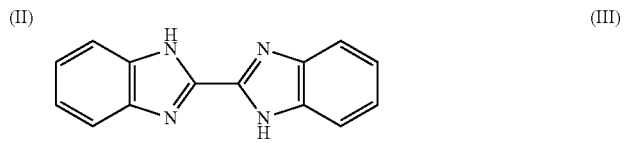

(III)

-continued
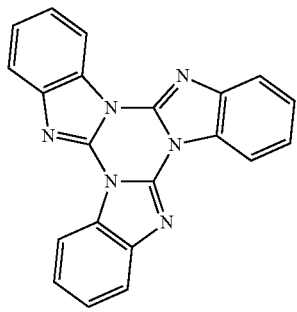
(IV)
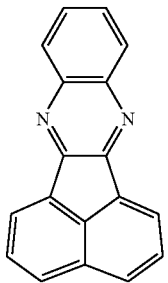
(V)
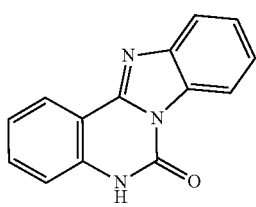
(VI)
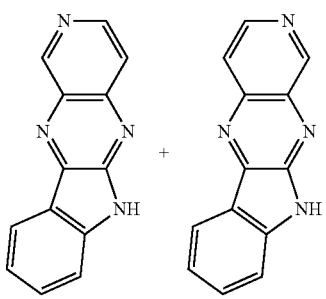
(VII)
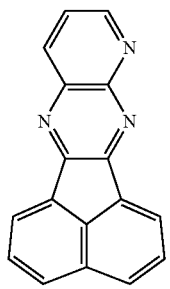
(VIII)
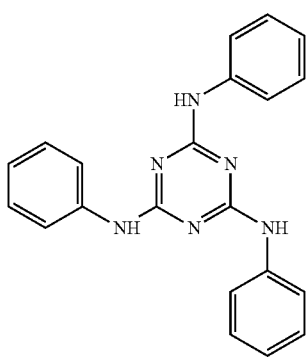
(IX)
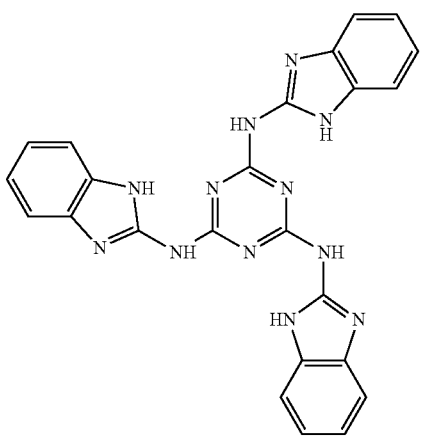
(X)
(XI)
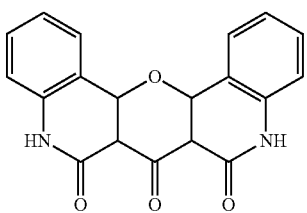
(XII)
(XIII)

-continued
(XIV)
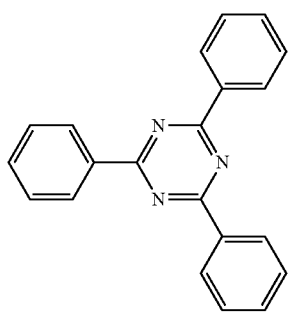
(XV)
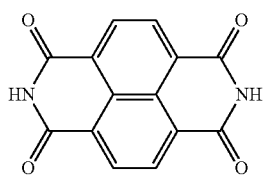
(XVI)
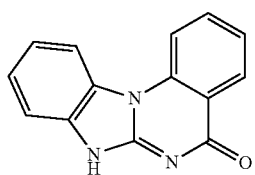
(XVII)
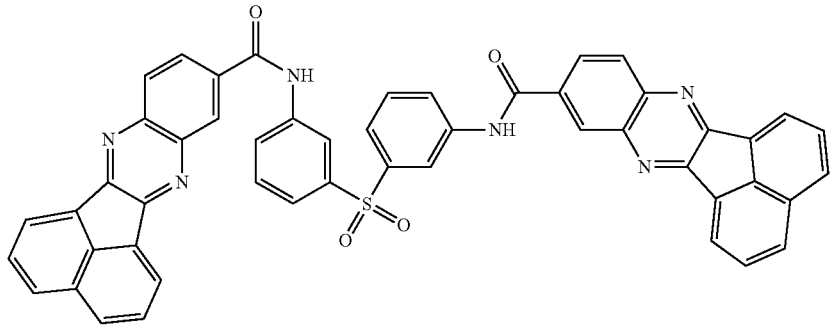
(XVIII)
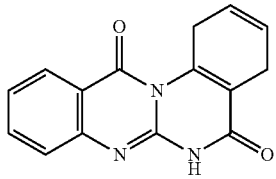
(XIX)
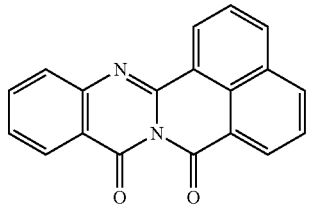
(XX)
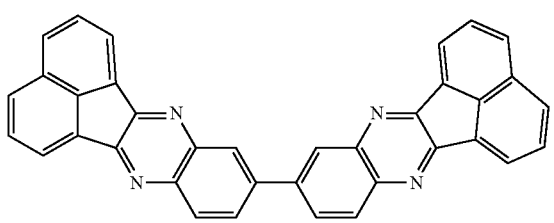
(XXI)
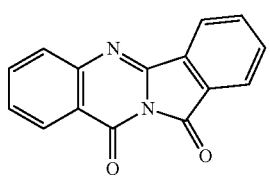
(XXII)
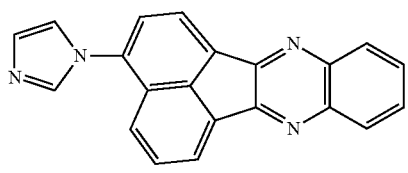
(XXIII)
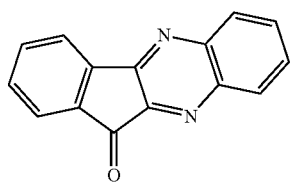

-continued
(XXIV)
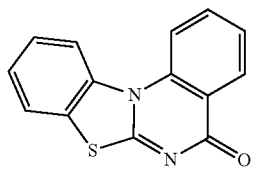
(XXV)
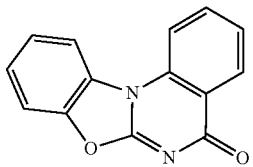
(XXVI)
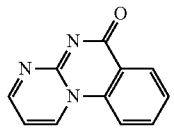
(XXVII)
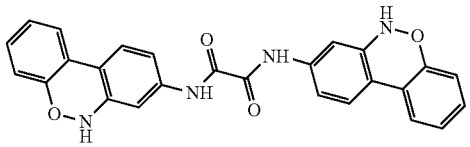
(XXVIII)
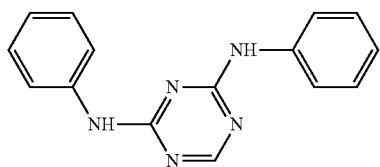
(XXIX)
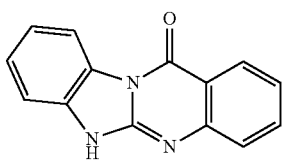
(XXX)
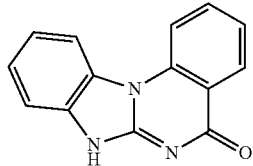
(XXXI)
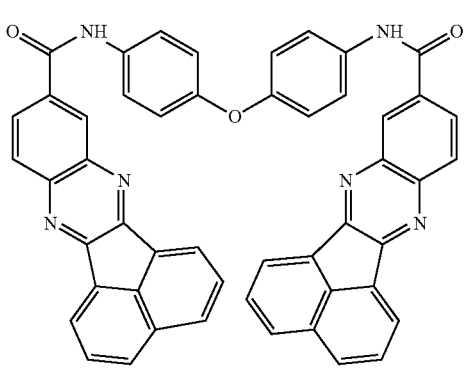
(XXXII)
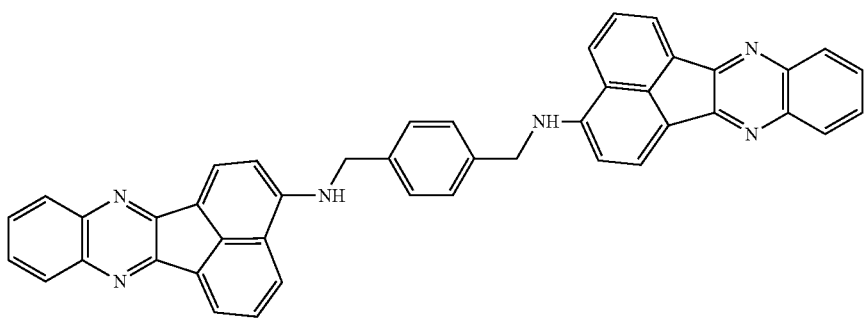
(XXXIII)
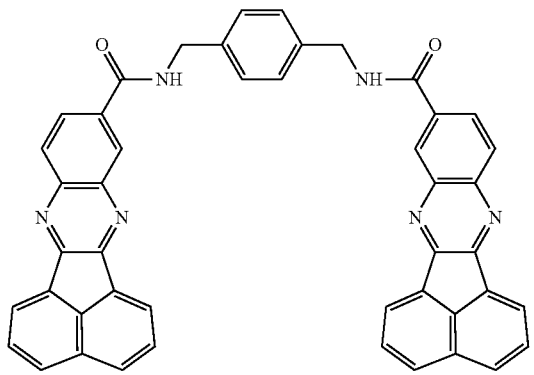
(XXXIV)
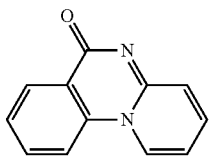

-continued
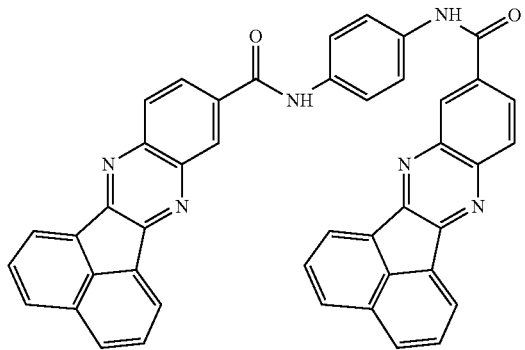
(XXXV)
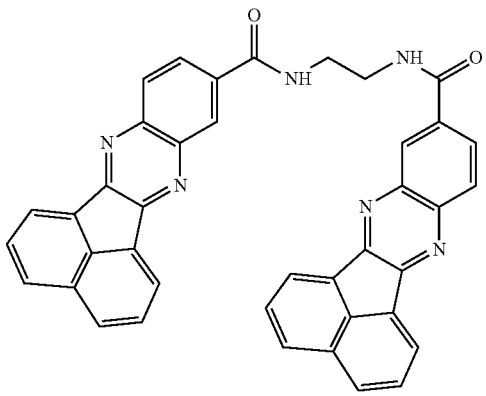
(XXXVI)
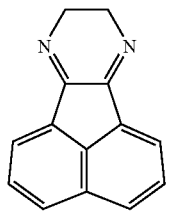
(XXXVII)
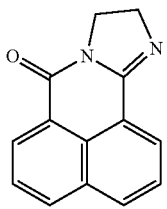
(XXXVIII)
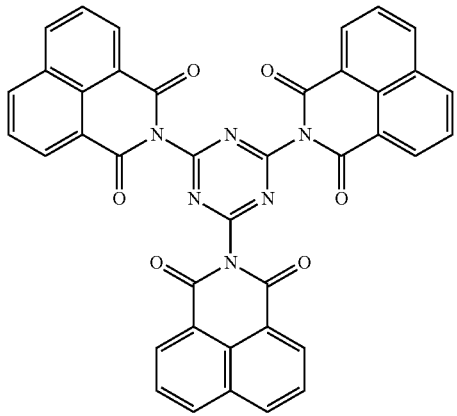
(XXXIX)
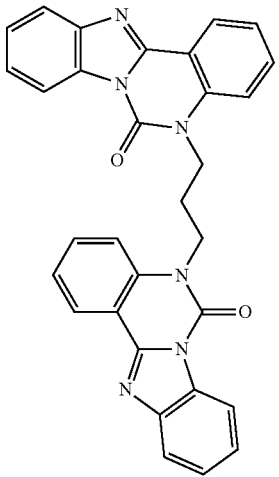
(XL)
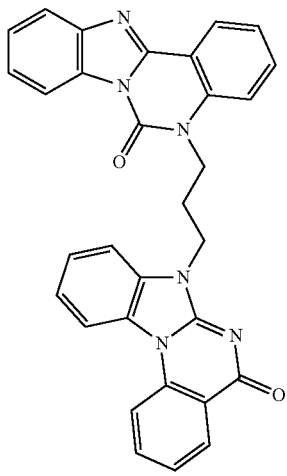
(XLI)
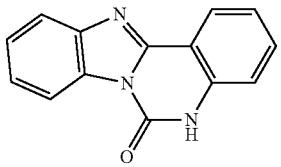
(XLII)

-continued

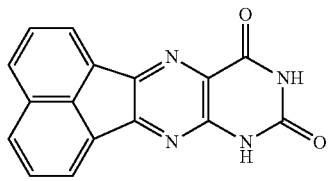
(XLIII)

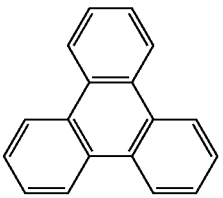
(XLIV)

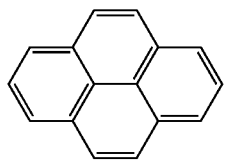
(XLV)

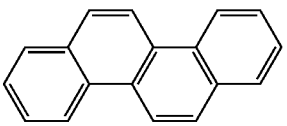
(XLVI)

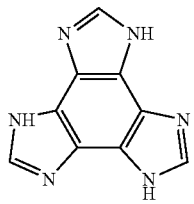
(XLVII)

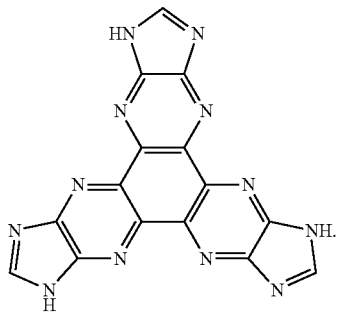
(XLVIII)

3. A liquid crystal display according to claim 1, wherein the counterion is selected from the list comprising ions of $H^+$, $NH_4^+$, $Na^+$, $K^+$, $Li^+$, $Ba^{++}$, $Ca^{++}$, $Mg^{++}$, $Sr^{++}$, $Cs^+$, $Pb^{++}$, and $Zn^{++}$.

4. The liquid crystal display according to claim 1, wherein said supramolecules have planar shapes and their planes are oriented substantially parallel to the surface of the retardation layer.

5. The liquid crystal display according to claim 1, wherein said non-covalent bonds are hydrogen bonds (H-bonds) or coordination bonds.

6. The liquid crystal display according to claim 1, wherein said retardation layer has at least partially crystalline structure.

7. The liquid crystal display according to claim 1, wherein said retardation layer is insoluble in water.

8. The liquid crystal display according to claim 1, wherein said compensating structure comprises at least two said retardation layers, of which at least one said retardation layer is an uniaxial retardation layer of the negative A-plate type, the fast axis of which is substantially parallel to the absorption axis of the first polarizing plate, and at least one said retardation layer is uniaxial retardation layer of the negative C-plate type.

9. The liquid crystal display according to claim 1, wherein said retardation layer is an uniaxial retardation layer of the negative A-plate type, the fast axis of which is substantially parallel to the absorption axis of the first polarizing plate, and the compensation structure further comprises a layer of triacetyl cellulose (TAC).

10. The liquid crystal display according to claim 9, wherein each of the first and second polarizing plates comprises at least one layer of triacetyl cellulose (TAC).

11. The liquid crystal display according to claim 1, wherein said compensation structure comprises at least two said retardation layers, of which at least one said retardation layer is a biaxial retardation layer of the negative AB-plate type and at least one said retardation layer is an uniaxial retardation layer of the negative C-plate type.

12. The liquid crystal display according to claim 1, wherein said retardation layer is a biaxial retardation layer of the negative AB-plate type, and the compensation structure further comprises a layer of triacetyl cellulose (TAC).

13. The liquid crystal display according to claim 1, wherein each of the first and second polarizing plates further comprises at least one layer of triacetyl cellulose (TAC), and said retardation layer is an uniaxial retardation layer of the negative A-plate type, the fast axis of which is substantially parallel to the absorption axis of the first polarizing plate.

14. The liquid crystal display according to claim 1, wherein said retardation layer is a biaxial retardation layer of the negative AB-plate type, and each of the first and second polarizing plates further comprises at least one layer of triacetyl cellulose (TAC).

15. An in-plane switching type liquid crystal display comprising:
(a) first and second polarizing plates facing each other and spaced from each other;
(b) a liquid crystal cell situated between said first and second polarizing plates, and
(c) at least one compensation structure;
wherein the director orientation of the liquid crystal layer of said cell being controlled by an electric field parallel to the polarizing plates,
wherein one compensating structure located between the liquid crystal cell and the first polarizing plate,
wherein the polarizing plates have transmission axes perpendicular to each other, and
the compensation structure comprises at least one retardation layer of supramolecules comprising at least one polycyclic organic compound with a conjugated π-system and functional groups which are capable of forming non-covalent bonds between said supramolecules, wherein the organic compound is an oligophenyl derivative having a general structural formula corresponding to one of structures 1 to 7:

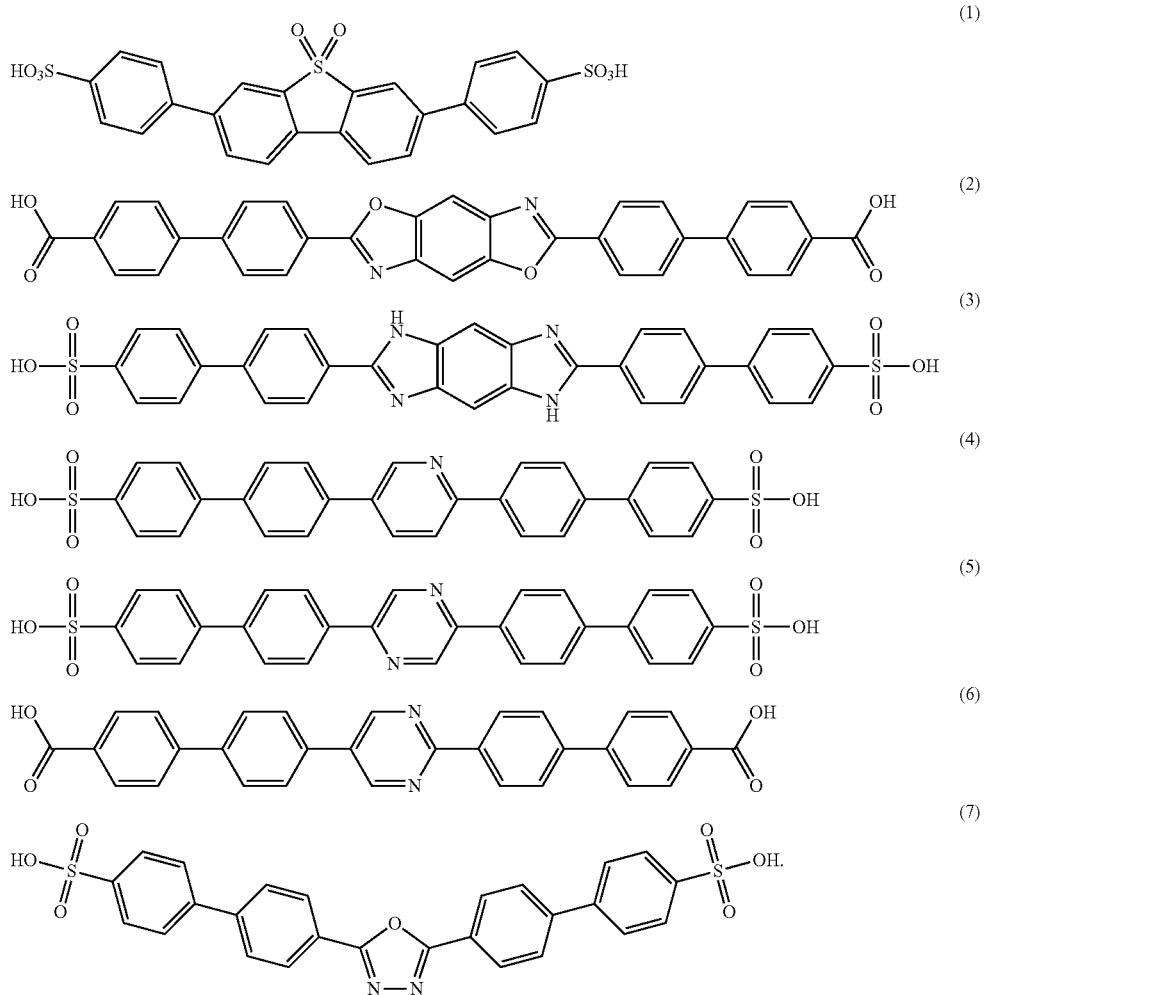

16. An in-plane switching type liquid crystal display comprising:
(a) first and second polarizing plates facing each other and spaced from each other;
(b) a liquid crystal cell situated between said first and second polarizing plates, and
(c) at least one compensation structure;
wherein the director orientation of the liquid crystal layer of said cell being controlled by an electric field parallel to the polarizing plates,
wherein one compensating structure located between the liquid crystal cell and the first polarizing plate,
wherein the polarizing plates have transmission axes perpendicular to each other, and
the compensation structure comprises at least one retardation layer of supramolecules comprising at least one polycyclic organic compound with a conjugated π-system and functional groups which are capable of forming non-covalent bonds between said supramolecules,
wherein the organic compound is a bibenzimidazole derivative and has a general structural formula corresponding to one of structures 8 to 9:

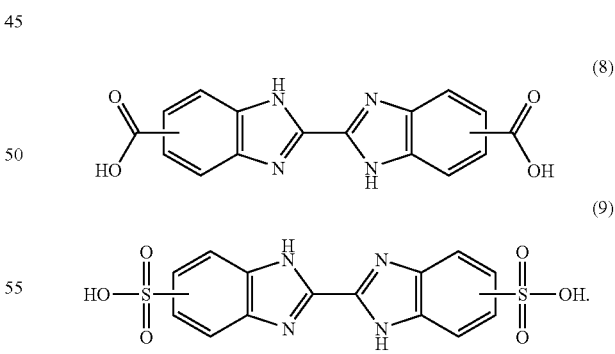

17. An in-plane switching type liquid crystal display comprising:
(a) first and second polarizing plates facing each other and spaced from each other;
(b) a liquid crystal cell situated between said first and second polarizing plates, and
(c) at least one compensation structure;

wherein the director orientation of the liquid crystal layer of said cell being controlled by an electric field parallel to the polarizing plates, wherein one compensating structure located between the liquid crystal cell and the first polarizing plate, wherein the polarizing plates have transmission axes perpendicular to each other, and the compensation structure comprises at least one retardation layer of supramolecules comprising at least one polycyclic organic compound with a conjugated π-system and functional groups which are capable of forming non-covalent bonds between said supramolecules, wherein the organic compound is a "triazine" derivative and has a general structural formula corresponding to one of structures 10 to 12:

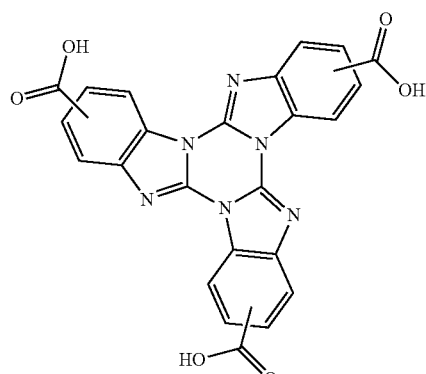
(10)

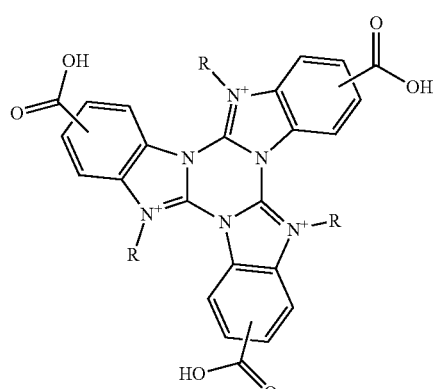
R = CH$_3$, C$_2$H$_5$, C$_3$H$_7$, C$_4$H$_9$
(11)

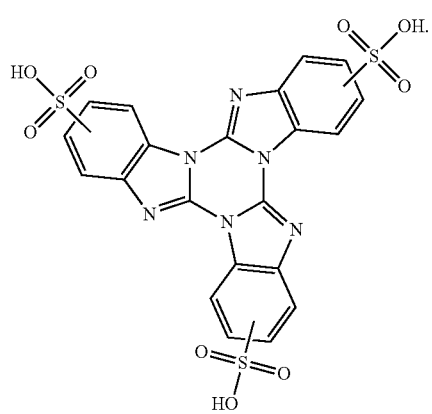
(12)

18. An in-plane switching type liquid crystal display comprising:

(a) first and second polarizing plates facing each other and spaced from each other;

(b) a liquid crystal cell situated between said first and second polarizing plates, and (c) at least one compensation structure;

wherein the director orientation of the liquid crystal layer of said cell being controlled by an electric field parallel to the polarizing plates, wherein one compensating structure located between the liquid crystal cell and the first polarizing plate, wherein the polarizing plates have transmission axes perpendicular to each other, and the compensation structure comprises at least one retardation layer of supramolecules comprising at least one polycyclic organic compound with a conjugated π-system and functional groups which are capable of forming non-covalent bonds between said supramolecules, wherein the organic compound is an acenaphthoquinoxaline derivative comprising a carboxylic group or sulfonic group and having a general structural formula corresponding to one of structures 13 to 31:

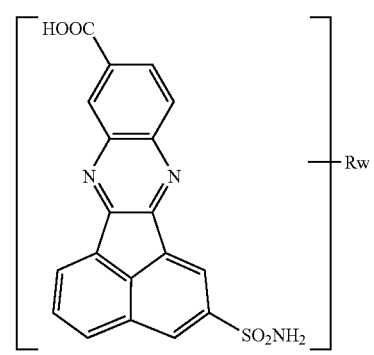
(13)

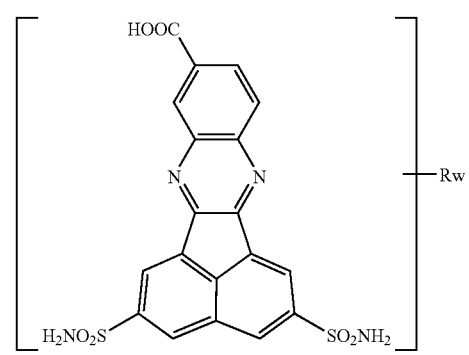
(14)

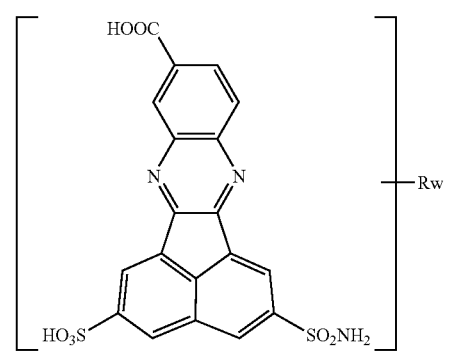
(15)

(16) 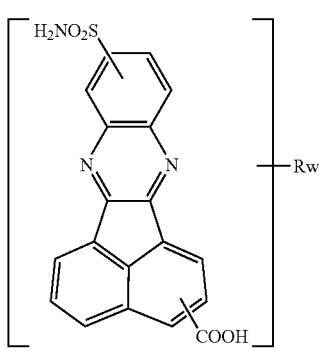
(17) 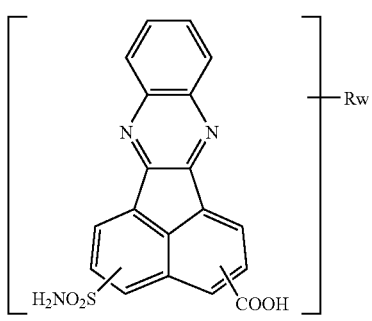
(18) 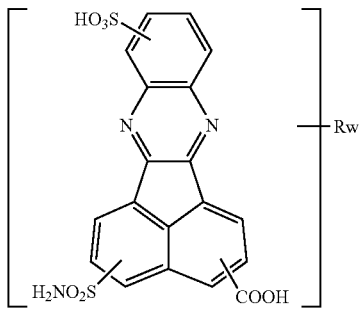
(19) 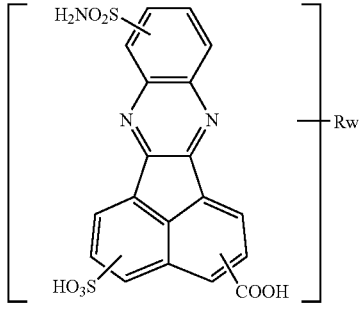
(20) 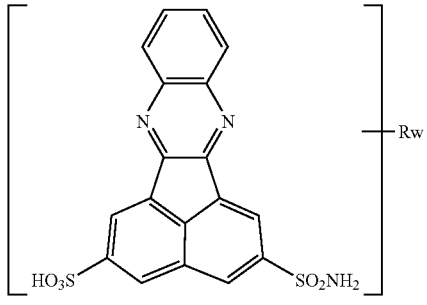
(21) 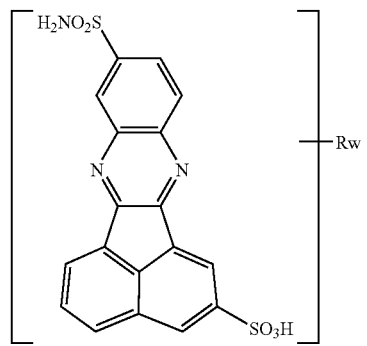
(22) 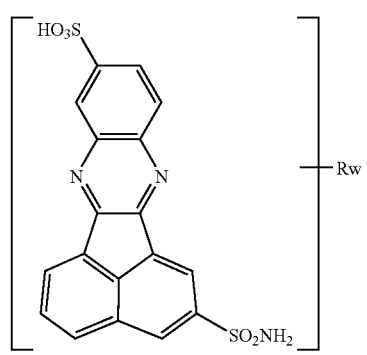
(23) 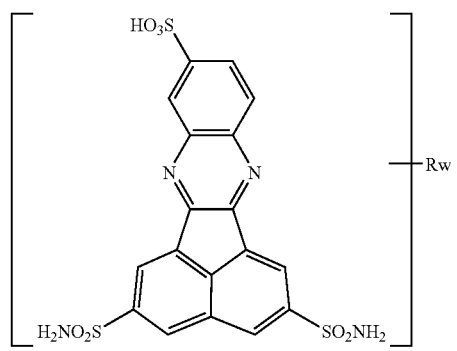
(24) 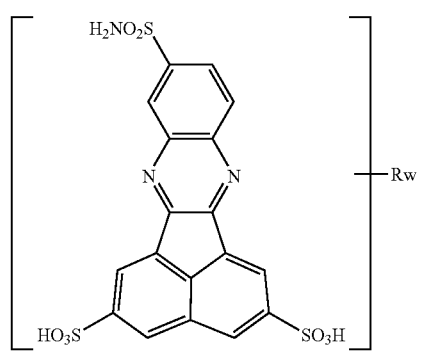

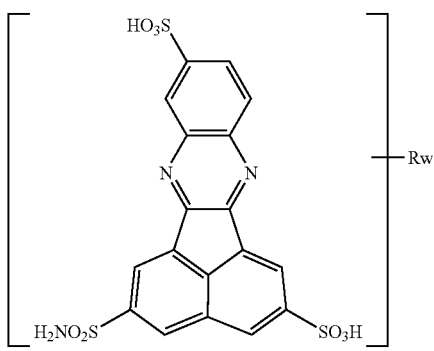

(25)

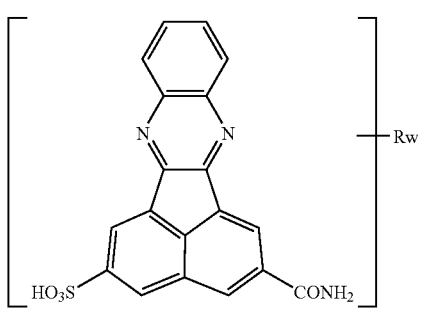

(26)

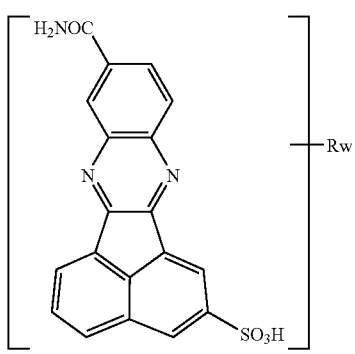

(27)

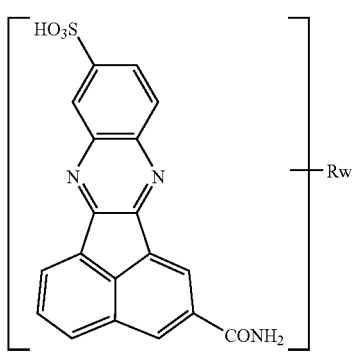

(28)

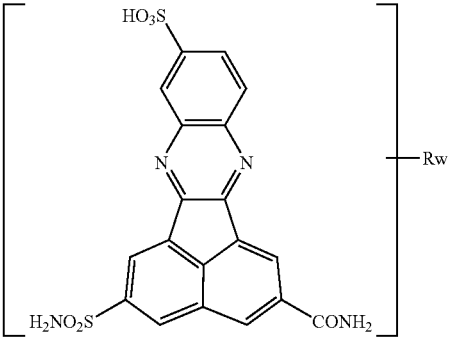

(29)

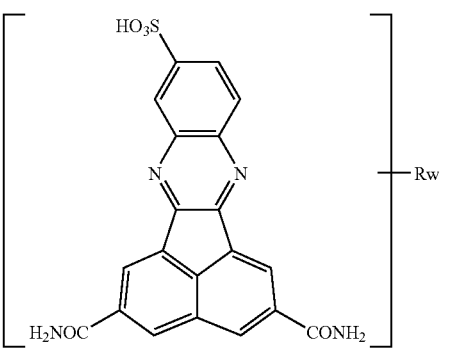

(30)

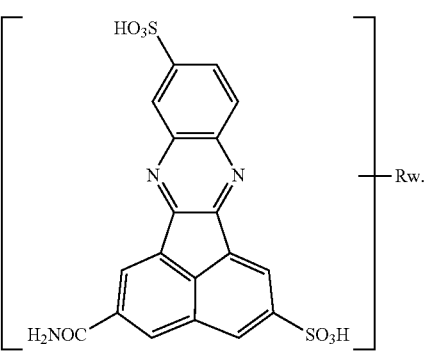

(31)

19. An in-plane switching type liquid crystal display comprising:
(a) first and second polarizing plates facing each other and spaced from each other;
(b) a liquid crystal cell situated between said first and second polarizing plates, and
(c) at least one compensation structure;
    wherein the director orientation of the liquid crystal layer of said cell being controlled by an electric field parallel to the polarizing plates,
    wherein one compensating structure located between the liquid crystal cell and the first polarizing plate,
    wherein the polarizing plates have transmission axes perpendicular to each other, and
the compensation structure comprises at least one retardation layer of supramolecules comprising at least one polycyclic organic compound with a conjugated π-system and functional groups which are capable of forming non-covalent bonds between said supramolecules,
    wherein the organic compound is a 6,7-dihydrobenzimidazo[1,2-c]quinazolin-6-one derivative having at least one carboxylic group —COOH, m is 1, 2 or 3, or at least one sulfonic group —SO$_3$H, n is 1, 2 or 3, and said derivative has a general structural formula from the group comprising structures 32 to 53:
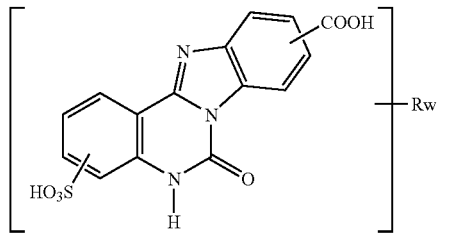 (32)
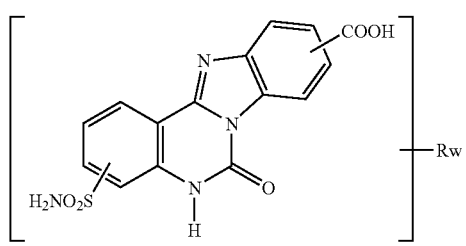 (33)
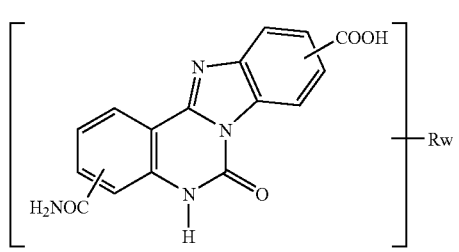 (34)
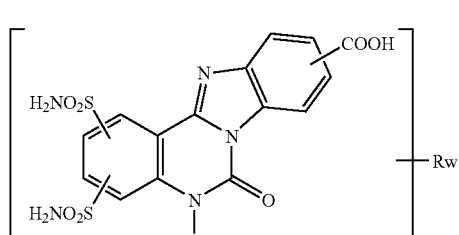 (35)
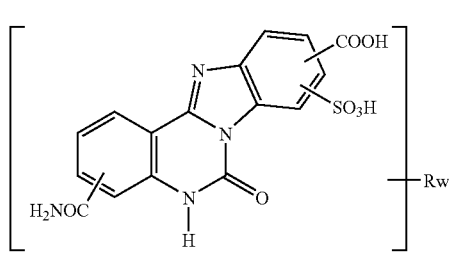 (36)
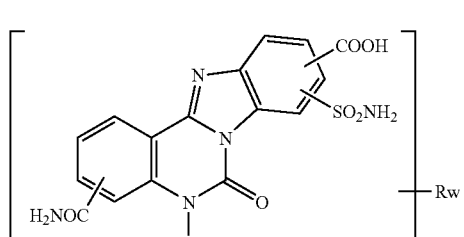 (37)
-continued
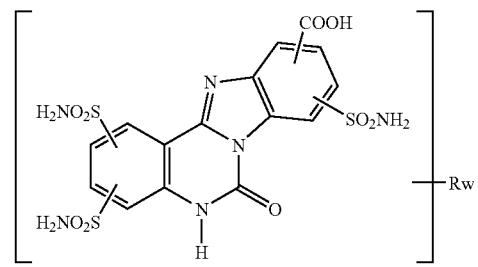 (38)
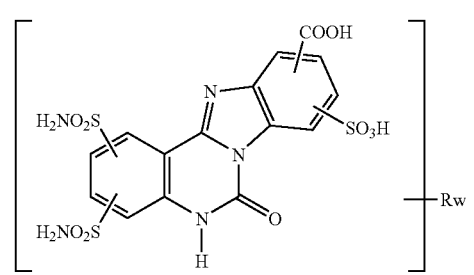 (39)
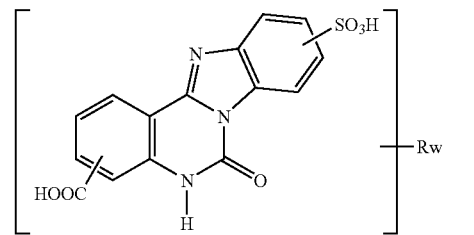 (40)
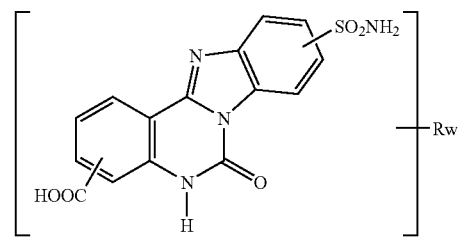 (41)
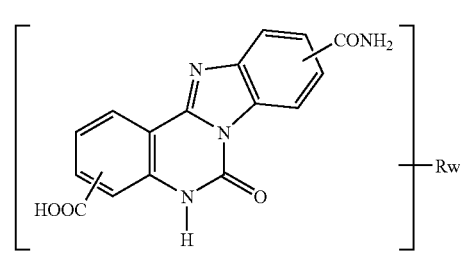 (42)
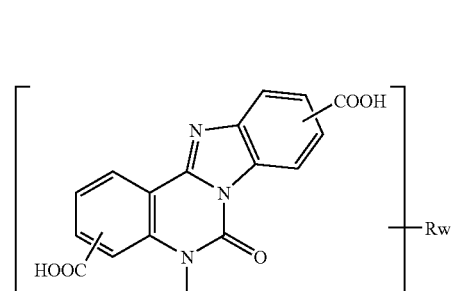 (43)

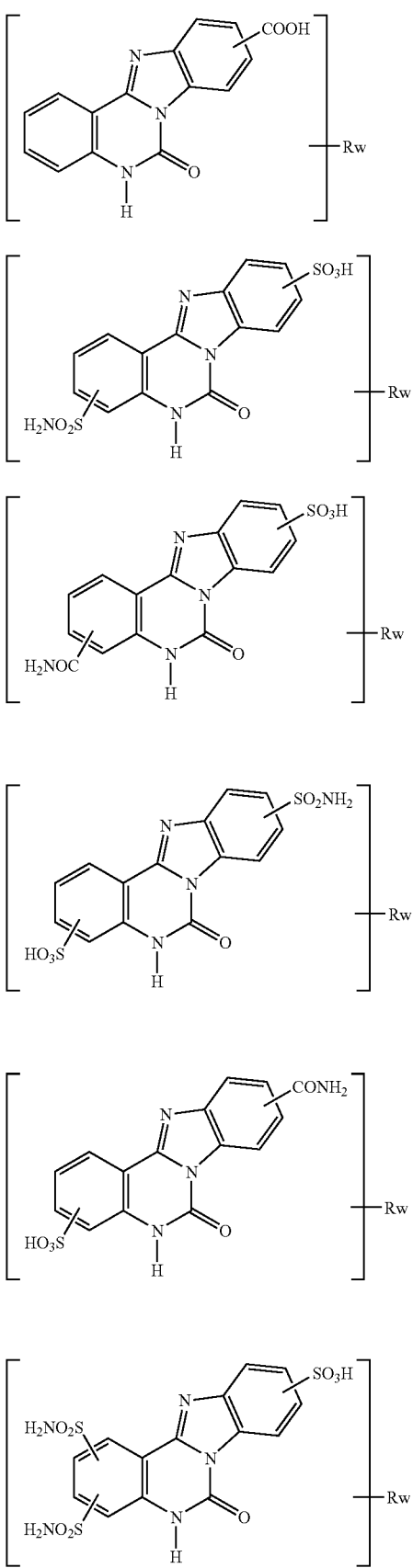
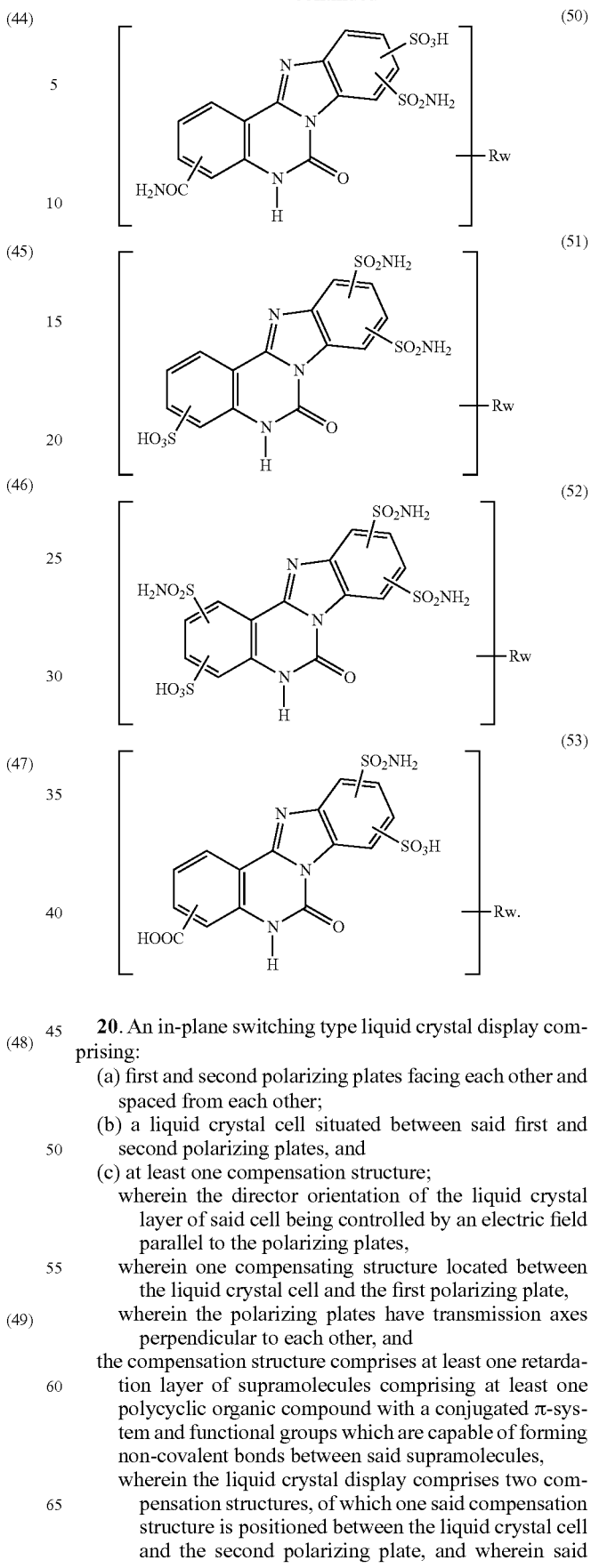

20. An in-plane switching type liquid crystal display comprising:
(a) first and second polarizing plates facing each other and spaced from each other;
(b) a liquid crystal cell situated between said first and second polarizing plates, and
(c) at least one compensation structure;
wherein the director orientation of the liquid crystal layer of said cell being controlled by an electric field parallel to the polarizing plates,
wherein one compensating structure located between the liquid crystal cell and the first polarizing plate,
wherein the polarizing plates have transmission axes perpendicular to each other, and
the compensation structure comprises at least one retardation layer of supramolecules comprising at least one polycyclic organic compound with a conjugated π-system and functional groups which are capable of forming non-covalent bonds between said supramolecules,
wherein the liquid crystal display comprises two compensation structures, of which one said compensation structure is positioned between the liquid crystal cell and the second polarizing plate, and wherein said retardation layers of each of two said compensation structures comprise an uniaxial retardation layer of the negative A-plate type, the fast axis of which is substantially parallel to the absorption axis of the first polarizing plate.

21. The liquid crystal display according to claim 20, wherein the first polarizing plate comprises at least one layer of triacetyl cellulose (TAC).

* * * * *